US011235432B2

(12) United States Patent
DesJardien et al.

(10) Patent No.: US 11,235,432 B2
(45) Date of Patent: Feb. 1, 2022

(54) MODULAR AND RECONFIGURABLE SUPPORT SYSTEM

(71) Applicant: The Boeing Company, Chicago, IL (US)

(72) Inventors: Matthew R. DesJardien, Kenmore, WA (US); Eric M. Reid, Kenmore, WA (US); James N. Buttrick, Seattle, WA (US); Darrell Darwin Jones, Mill Creek, WA (US); Dan Dresskell Day, Seattle, WA (US); Paul Reed Stone, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 916 days.

(21) Appl. No.: 15/896,108

(22) Filed: Feb. 14, 2018

(65) Prior Publication Data
US 2018/0169807 A1    Jun. 21, 2018

Related U.S. Application Data

(62) Division of application No. 13/904,789, filed on May 29, 2013, now Pat. No. 9,925,629.

(51) Int. Cl.
*B23Q 1/64* (2006.01)
*B23Q 1/25* (2006.01)
(Continued)

(52) U.S. Cl.
CPC .............. *B23Q 1/64* (2013.01); *B23P 19/10* (2013.01); *B23Q 1/25* (2013.01); *B64F 5/10* (2017.01);
(Continued)

(58) Field of Classification Search
CPC . B23Q 1/64; B23Q 1/25; B23Q 1/035; B23Q 1/037; B64F 5/10; B23P 19/10;
(Continued)

(56) References Cited

U.S. PATENT DOCUMENTS

| 5,604,974 A | 2/1997 | Roberts et al. |
| 5,621,970 A | 4/1997 | Roberts et al. |

(Continued)

FOREIGN PATENT DOCUMENTS

| CN | 102339069 A | 2/2012 |
| CN | 102730197 A | 10/2012 |

(Continued)

OTHER PUBLICATIONS

European Patent Office Communication Report, dated Oct. 4, 2018, regarding Application No. 13170662.4, 5 pages.

(Continued)

*Primary Examiner* — Tyrone V Hall, Jr.
*Assistant Examiner* — Abbie E Quann
(74) *Attorney, Agent, or Firm* — Yee & Associates, P.C.

(57) ABSTRACT

An apparatus and method for supporting an object. In one illustrative embodiment, an apparatus may comprise a support structure, a positioning system, and a retention system. The positioning system may be associated with the support structure and configured to position the support structure with respect to a number of linear axes. The retention system may be associated with the support structure. The retention system may be configured to retain a portion of an object and move the portion of the object towards a platform such that the portion of the object substantially conforms to a shape of the platform.

20 Claims, 23 Drawing Sheets

(51) Int. Cl.
*B64F 5/10* (2017.01)
*B23P 19/10* (2006.01)

(52) U.S. Cl.
CPC ..... *B23P 2700/01* (2013.01); *Y10T 29/49998* (2015.01)

(58) Field of Classification Search
CPC ............ B23P 2700/01; Y10T 29/49998; B66F 7/065; B66F 7/0683; B66F 7/22; B66F 7/26; B66F 3/22; B25H 1/0007
USPC .......................................................... 269/21
See application file for complete search history.

(56) References Cited

U.S. PATENT DOCUMENTS

| | | | | |
|---|---|---|---|---|
| 6,979,288 | B2 * | 12/2005 | Hazlehurst | B21C 51/005 29/281.5 |
| 8,392,024 | B2 * | 3/2013 | Murayama | G05B 19/423 700/260 |
| 9,132,924 | B2 * | 9/2015 | Stark | B64F 5/10 |
| 2004/0093731 | A1 * | 5/2004 | Sarh | B21J 15/10 29/897.3 |
| 2008/0155807 | A1 | 7/2008 | Toh et al. | |
| 2009/0278098 | A1 * | 11/2009 | Bacon | B66F 7/0683 254/1 |
| 2010/0135754 | A1 | 6/2010 | Weber | |
| 2010/0183414 | A1 * | 7/2010 | Konosu | B25J 9/107 414/589 |
| 2012/0130528 | A1 | 5/2012 | Stark et al. | |
| 2014/0353894 | A1 | 12/2014 | DesJardien et al. | |
| 2018/0148195 | A1 * | 5/2018 | Chan, Jr. | B64F 5/10 |

FOREIGN PATENT DOCUMENTS

| | | |
|---|---|---|
| CN | 202574627 U | 12/2012 |
| DE | 102009018991 A1 | 11/2010 |
| EP | 0277423 A1 | 8/1988 |
| EP | 2402253 A1 | 1/2012 |
| JP | 2011148559 A | 8/2011 |
| JP | 4974999 B2 | 7/2012 |
| JP | 2012131239 A | 7/2012 |
| JP | 2012525266 A | 10/2012 |
| WO | WO03037564 A2 | 5/2003 |
| WO | WO2011061307 A1 | 5/2011 |

OTHER PUBLICATIONS

European Patent Office Communication Report, dated Oct. 5, 2018, regarding Application No. 14732474.3, 6 pages.
The Korean Intellectual Property Office Notice of Office Action and English translation, dated May 11, 2020, regarding Application No. 10-2015-7024764, 16 pages.
Results of the Partial International Search, dated Sep. 30, 2014, regarding Application No. PCT/US2014/036614, 8 pages.
State Intellectual Property Office of China Notification of First Office Action and Partial English Translation, dated Dec. 1, 2016, regarding Application No. 20140030074.8, 14 pages.
Canadian Intellectual Property Office Office Action, dated Aug. 24, 2017, regarding Application 2,902,277, 13 pages.
State Intellectual Property Office of PRC Notification of Second Office Action, dated Aug. 11, 2017, regarding Application No. 201480030074.8, 19 pages.
Japanese Patent Office Notice of Reasons for Rejection, dated Aug. 30, 2017, regarding Application No. 2016-516665, 15 pages.
Office Action, dated Apr. 7, 2017, regarding U.S. Appl. No. 13/904,789, 21 pages.
Final Office Action, dated Sep. 15, 2017, regarding U.S. Appl. No. 13/904,789, 6 pages.
Notice of Allowance, dated Nov. 16, 2017, regarding U.S. Appl. No. 13/904,789, 15 pages.

* cited by examiner

MODULAR AND RECONFIGURABLE SUPPORT SYSTEM

CROSS REFERENCE TO RELATED APPLICATIONS

This application is related to the following U.S. patent application Ser. No. 13/904,789, entitled "Modular and Reconfigurable Support System," attorney docket number 12-1563-US-NP, filed May 29, 2013 and is incorporated herein by reference in its entirety.

BACKGROUND INFORMATION

1. Field

The present disclosure relates generally to installing panels on structures and, in particular, to attaching a wing skin to a wing box. Still more particularly, the present disclosure relates to a modular and reconfigurable support system for use in supporting, positioning, and loading a wing skin underneath a wing box for attachment to the wing box.

2. Background

The wing of an aircraft may be formed using a wing box and two wing skins. One wing skin may be attached to the upper side of the wing box, while the other wing skin may be attached to the lower side of the wing box. Depending on the implementation, a wing skin may be attached to a support structure of the wing box, ribs, spars, stringers, and/or one or more other types of components used to form a wing. Some currently available systems for supporting and loading a wing skin to the lower side of a wing box may create obstacles that limit access to the wing skin and/or wing box by personnel and/or equipment. For example, without limitation, the obstacles presented by this type of support system may present challenges for an operator to access certain portions of the wing skin and/or wing box without running into the support system and/or other equipment.

Further, some currently available systems for supporting and loading a wing skin may be less ergonomic than desired. For example, these currently available systems may require that operators work at a higher work height than desired and/or work from raised platforms. Consequently, performing operations, such as drilling operations, fastening operations, tacking operations, and/or other operations, may be more difficult and/or time-consuming than desired with these types of support systems.

In particular, some currently available systems may require that drilling operations and assembly operations be performed around obstructions created by these support systems. This type of setup may create zones in which personnel may not enter and/or in which work cannot be performed. The system requirements and complexity of the automated tools that may be used with these types of currently available systems may be greater than desired.

Additionally, some currently available support systems may not be reconfigurable. In other words, a support system used for loading wing skins for one type of aircraft may be unable to load wing skins for a different type of aircraft.

Further, these types of support systems may require dedicated tooling, which may increase the cost of using these types of support systems more than desired. The dedicated tooling may be configured for specific types of aircraft, geometry, and/or other factors. Altering a support system to accommodate different types of aircraft and/or different types of geometry may be more difficult than desired and, in some cases, not possible.

Additionally, some support systems may not integrate lifting the wing skins with the handling of the wing systems. For example, in some cases, a dedicated numerically-controlled (NC) lift system may be needed to elevate the tooling needed to assemble a wing skin to a wing box up to the wing box. Using this type of numerically-controlled lift system may be more expensive than desired and may obstruct access to portions of the wing skin and/or the wing box more than desired. Therefore, it would be desirable to have a method and apparatus that take into account at least some of the issues discussed above, as well as other possible issues.

SUMMARY

In one illustrative embodiment, an apparatus may comprise a support structure, a positioning system, and a retention system. The positioning system may be associated with the support structure and configured to position the support structure with respect to a number of linear axes. The retention system may be associated with the support structure. The retention system may be configured to retain a portion of an object and move the portion of the object towards a platform such that the portion of the object substantially conforms to a shape of the platform.

In another illustrative embodiment, a modular support system may comprise a number of support modules and a base. A support module in the number of support modules may comprise a support structure, a positioning system, a retention system, and an attachment system. The positioning system may be associated with the support structure and configured to position the support structure with respect to a number of linear axes. The retention system may be associated with the support structure. The retention system may be configured to retain a portion of an object and move the portion of the object towards a platform such that the portion of the object substantially conforms to a shape of the platform. The attachment system may be configured for use in attaching a tool to the support structure. The number of support modules may be configured to move along the base.

In yet another illustrative embodiment, a method for supporting an object may be provided. A portion of the object may be retained using a retention system associated with a support structure. The support structure may be positioned with respect to a number of linear axes such that the portion of the object is positioned relative to a platform. The object may be moved towards the platform using the retention system such that the portion of the object substantially conforms to a shape of the platform.

In still yet another illustrative embodiment, a method for supporting and loading a wing skin underneath a wing box may be provided. The wing skin may be supported on a support structure of each of a number of support modules in a modular support system by retaining the wing skin using a retention system of each of the number of support modules. The wing skin may be positioned in a selected position underneath the wing box using a positioning system of each of the number of support modules. The wing skin may be moved towards the wing box until the wing skin substantially conforms to a shape of the wing box using the retention system of each of the number of support modules. The wing skin may be attached to the wing box using a tool attached to the support structure of each of the number of support modules.

In another illustrative embodiment, a method for transporting and loading an object to a platform in a flexible manufacturing environment may be provided. The object may be supported using a number of support modules that are reconfigurable and capable of supporting objects of varying shapes, sizes, and contours. The number of support modules may be moved within the flexible manufacturing environment to transport the object to a selected position underneath the platform. The object may be raised upwards to the platform using the number of support modules until the object substantially conforms to a contour of the platform. A number of operations may be performed on at least one of the object and the platform using at least one tool integrated with the number of support modules, while the object is being supported by the number of support modules.

In yet another illustrative embodiment, a method for transporting and loading wing skins to wing boxes may be provided. A number of support modules supporting a first wing skin on top of the number of support modules may be moved to transport the first wing skin to a first selected position underneath a first wing box. The number of support modules may be part of a modular support system that is reconfigurable. The first wing skin may be raised upwards to the first wing box using the number of support modules until the first wing skin substantially conforms to a first contour of the first wing box to load the first wing skin to the first wing box. The first wing skin may be secured to the first wing box using at least one tool integrated with the number of support modules. The number of support modules may be moved away from the first wing skin once the first wing skin has been secured to the first wing box. The number of support modules may be reconfigured to form a modified number of support modules that is configured to support a second wing skin for a second wing box.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a reconfigurable support system capable of supporting and loading a wing skin underneath a wing box for an aircraft. Further, the illustrative embodiments recognize and take into account that it may be desirable to have a support system that does not create obstacles for personnel and/or equipment attempting to perform operations on the wing skin and/or the wing box.

Thus, the illustrative embodiments provide an apparatus, system, and method for supporting and loading a wing skin underneath a wing box. In particular, the illustrative embodiments provide a modular support system that may be reconfigured for different types of aircraft. Further, this modular support system may allow for operations to be performed without creating obstacles for the personnel and/or equipment needed to perform these operations. Still further, the modular support system may be configured to hold and support tools, including automated tools, for performing automated operations.

Figure 1:
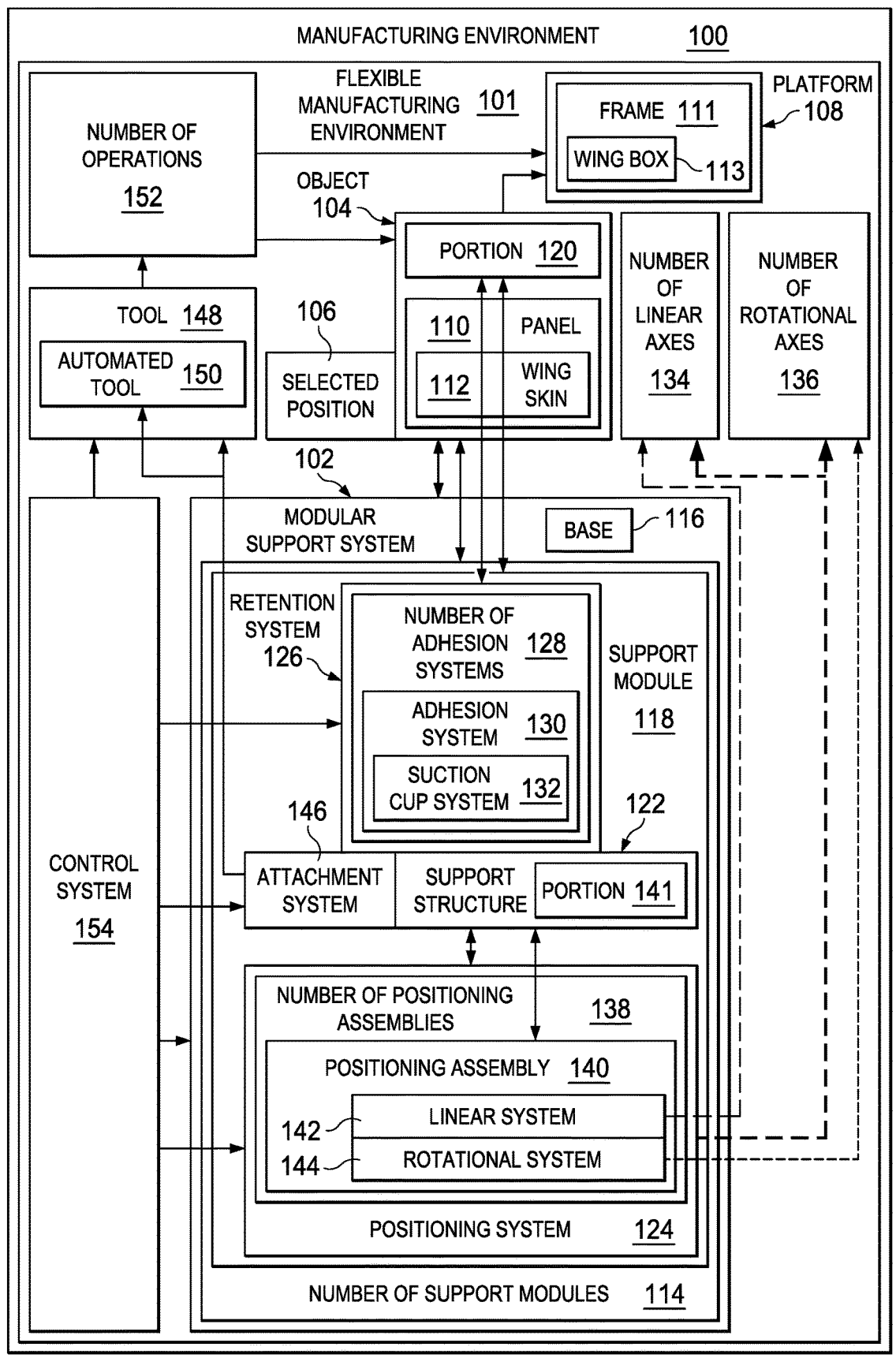
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. Manufacturing environment 100 is depicted in FIG. 1. In one illustrative example, manufacturing environment 100 may take the form of flexible manufacturing environment 101.

Within manufacturing environment 100, modular support system 102 may be used to support, transport, and load object 104 into selected position 106 relative to platform 108. In some cases, selected position 106 may be the position at which object 104 needs to be positioned such that object 104 may be attached to platform 108. In this illustrative example, selected position 106 may be a position underneath platform 108. In another illustrative example, selected position 106 may be a position to the side of platform 108.

Object 104 and platform 108 may take a number of different forms. For example, object 104 may take the form of panel 110 and platform 108 may take the form of frame 111. Panel 110 may be any type of panel, may have any of a number of different types of shapes, and/or may be comprised of any number of individual panels that have been connected together. Frame 111 may be any type of frame. In one illustrative example, panel 110 and frame 111 may take the form of wing skin 112 and wing box 113, respectively.

Although modular support system 102 is described as being used with wing skin 112 and wing box 113, modular support system 102 may be configured for use with wing skins and wing boxes of different shapes and/or sizes. In particular, modular support system 102 may be configured to support, transport, and load wing skins of varying contours to wing boxes of different contours. In this manner, modular support system 102 may be considered a flexible modular support system.

Of course, in other illustrative examples, platform 108 may take some other form. Platform 108 may take the form of, for example, without limitation, an aircraft fuselage frame, a ship frame, a building frame, a manmade structure, a bridge, or some other type of platform. Further, object 104 may take some other form such as, for example, without limitation, a window, a door, a flooring, or some other type of object.

As depicted, modular support system 102 may include number of support modules 114 and base 116. As used herein, a "number of" items may include one or more items. In this manner, number of support modules 114 may be one or more support modules. Number of support modules 114 may be supported by base 116 and in some cases, be configured to move along base 116.

Support module 118 may be an example of one implementation for a support module in number of support modules 114. In one illustrative example, when object 104 is being supported by modular support system 102, support module 118 may be used to support portion 120 of object 104. Portion 120 may be a designated portion of object 104 Depending on the implementation, portion 120 of object 104 may be some or all of object 104. As depicted, support module 118 includes support structure 122, positioning system 124, and retention system 126.

Support structure 122 may provide the structural support and load support for portion 120 of object 104. In some cases, support structure 122 may be referred to as a header or a header board. Both positioning system 124 and retention system 126 may be associated with support structure 122. As used herein, when one component is "associated" with another component, the association is a physical association in the depicted examples.

For example, a first component, such as retention system 126, may be considered to be associated with a second component, such as support structure 122, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Additionally, the association between these two components may be a permanent association or a temporary association, depending on the implementation. For example, without limitation, two components that have been connected together may be permanently affixed to each other or may be detachable.

In this illustrative example, retention system 126 may be attached to support structure 122 independently of positioning system 124. Retention system 126 may be used to hold portion 120 of object 104. In one illustrative example, retention system 126 may take the form of number of adhesion systems 128. Each of number of adhesion systems 128 may be used to attach support structure 122 to portion 120 of object 104. More specifically, each of number of adhesion systems 128 may adhere to portion 120 of object 104, which may, in turn, connect support structure 122 to portion 120 of object 104 because support structure 122 is associated with number of adhesion systems 128.

Each of number of adhesion systems 128 may be implemented in a number of different ways. Adhesion system 130 may be an example of one of number of adhesion systems 128. Adhesion system 130 may be implemented using, for example, without limitation, suction cup system 132. Suction cup system 132 may use one or more suction cups to adhere to portion 120 of object 104 by applying at least one of a vacuum and negative pressure to portion 120 of object 104.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Additionally, suction cup system 132 may be configured to move portion 120 of object 104 towards platform 108 and self-adjust as object 104 is attached to platform 108. For example, without limitation, object 104 may have a flat shape, while platform 108 may have a curved shape. Suction cup system 132 may be used to move portion 120 of object 104 towards platform 108. As object 104 encounters platform 108, suction cup system 132 may apply force to object 104 to cause object 104 to substantially conform to the curved portion of platform 108 in contact with object 104. Further, the one or more suction cups within suction cup system 132 may be configured to self-adjust with respect to orientation to allow object 104 to substantially conform to the curved portion of platform 108.

The curved portion of platform 108 may have varying radii of curvature along the curved portion. In some cases, the curved portion may be a concave shape, a convex shape, or some other type of shape. Of course, in other illustrative examples, platform 108 may have some shape other than a curved shape. For example, without limitation, platform 108 may have a substantially planar shape.

In this illustrative example, positioning system 124 may be used to move support structure 122. In particular, positioning system 124 may be used to position support structure 122 with respect to number of linear axes 134. Number of linear axes 134 may include at least one of an X-axis, a Y-axis, and a Z-axis along which support structure 122 may be moved. In this illustrative example, the X-axis may be a longitudinal axis, the Y-axis may be a transverse axis, and the Z-axis may be a vertical axis.

Further positioning system 124 may be used to position support structure 122 with respect to number of rotational axes 136. Number of rotational axes 136 may include at least one of an A-axis, a B-axis, and a C-axis. As used herein, the A-axis may be a rotational axis describing movement about the X-axis. Further, the B-axis, as used herein, may be a rotational axis describing movement about the Y-axis, and the C-axis, as used herein, may be a rotational axis describing movement about the Z-axis.

Positioning system 124 may be implemented in a number of different ways. For example, without limitation, positioning system 124 may include number of positioning assemblies 138. In one illustrative example, number of positioning assemblies 138 may be two positioning assemblies. Positioning assembly 140 may be an example of one implementation for a positioning assembly in number of positioning assemblies 138. Positioning assembly 140 may be configured for association with portion 141 of support structure 122.

As depicted, positioning assembly 140 may include linear system 142 and rotational system 144. Linear system 142 may allow portion 141 of support structure 122 to be moved along number of linear axes 134. Rotational system 144 may allow portion 141 of support structure 122 to be moved along number of rotational axes 136.

In this illustrative example, linear system 142 and rotational system 144 may be comprised of any number of components and/or devices. For example, without limitation, linear system 142 may include at least one of a lift device, a scissor lift, a plurality of wheels, a plurality of tracks, a plurality of rollers, a plurality of actuation devices, a plurality of slides, or some other type of device. Similarly, rotational system 144 may include, for example, without limitation, at least one of a plurality of bearings, a number of plates, a number of tilting devices, a number of rotating devices, a number of actuators, a number of feedback encoders, a number of drive motors, a number of brakes, or some other type of device.

Positioning system 124 may be used to both hold and position support structure 122 relative to base 116. Further, positioning system 124 may be used to position support structure 122 such that portion 120 of object 104 attached to support structure 122 through retention system 126 may also be positioned.

In some illustrative examples, attachment system 146 may be associated with support structure 122. Attachment system 146 may be considered part of or separate from support module 118, depending on the implementation. Further, attachment system 146 may be considered part of or separate from modular support system 102, depending on the implementation.

Attachment system 146 may be used to attach tool 148 to support structure 122. Attachment system 146 may comprise, for example, without limitation, a number of rails that may be used to hold tool 148 and allow tool 148 to move along support structure 122. Tool 148 may be used to perform number of operations 152 on object 104 and/or platform 108. Number of operations 152 may include, for example, without limitation, at least one of drilling, tacking, fastening, riveting, countersinking, nut-driving, painting, reworking, tagging, marking, inspecting, imaging, videoing, or some other type of operation.

Tool 148 may include any number of tools, devices, pieces of equipment, and/or other elements needed to perform number of operations 152. In some illustrative examples, tool 148 may take the form of automated tool 150. Automated tool 150 may be any tool that may be operated independently of a human operator or at least partially independently of a human operator. In some cases, automated tool 150 may be a semi-automated tool.

Positioning system 124, retention system 126, and number of adhesion systems 128 in support module 118 may be configured such that support module 118 may be configured to support different portions of an object when needed. In other words, support module 118 may be reconfigurable such that some other portion of object 104, other than portion 120, may be supported by support module 118. Further, support module 118 may be reconfigurable such that a portion of an object having a different size, shape, and/or contour as compared to object 104 may be supported by support module 118. For example, without limitation, number of support modules 114 may be reconfigured to support a new object to be loaded to a new platform in which the new object has a different contour compared to object 104. In this manner, support module 118 may be flexible.

For example, without limitation, control system 154 may be used to control modular support system 102. Control system 154 may be implemented using hardware, software, or a combination of the two. In one illustrative example, control system 154 may be implemented using a computer system comprising one or more computers. When more than one computer is present, these computers may be in association with each other.

Depending on the implementation, control system 154 may be used to control at least one of positioning system 124, retention system 126, attachment system 146, or automated tool 150. In this manner, control system 154 may be used to position object 104 relative to platform 108 such that object 104 may be fastened to platform 108 according to specified requirements, tolerances, and/or rules.

Modular support system 102 may be both modular and reconfigurable. In particular, the particular types of support modules used in number of support modules 114 may be changed at any point in time. For example, in some cases, number of support modules 114 may include ten support modules all having support structures of the same length. However, in another illustrative example, each support module in number of support modules 114 may have a support structure with a different length than the other support structures.

Further, support modules may be switched out, replaced, and/or altered at any point in time such that modular support system 102 may be configured for use with different types of objects for different types of platforms. In particular, number of support modules 114 may be reconfigured by at least one of changing a position of a support module in number of support modules 114 relative to other support modules in number of support modules 114, replacing a support module in number of support modules 114, altering a support module in number of support modules 114, removing a support module from number of support modules 114, or adding a new support module to number of support modules 114. In this manner, modular support system 102 may be reconfigured for each different type of object to be supported by modular support system 102.

Typically, the ground in flexible manufacturing environment 101 may be substantially smooth. The type of modular support system 102 described above may be suitable for use on a floor that is substantially smooth, such as, for example, without limitation, a concrete floor. Modular support system 102 may be used as part of a flexible manufacturing system in flexible manufacturing environment 101.

Further, the modular nature of modular support system 102 may enable progressive removal of number of support modules 114 as object 104 supported by modular support system 102 is loaded to and secured to platform 108. In other words, number of support modules 114 may be moved away from object 104 in a progressive manner once object 104 is secured to platform 108. In particular, a support module in number of support modules 114 may be moved away from object 104 when the portion of object 104 being supported by the support module has been secured to platform 108. For example, without limitation, when portion 120 of object 104 being supported by support module 118 has been secured to platform 108, support module 118 may be removed from underneath platform 108.

The illustration of manufacturing environment 100 and modular support system 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, without limitation, attachment system 146 may not be associated with support structure 122. In other illustrative examples, adhesion system 130 may be implemented using some other type of adhesion system other than suction cup system 132. For example, adhesion system 130 may be implemented with pads that use friction to prevent sliding.

In still other illustrative examples, retention system 126 may be implemented using a number of mechanical attachment devices instead of number of adhesion systems 128. In one illustrative example, retention system 126 may be implemented using a number of inflatable bladders and a roughly shaped contour board to support and retain object 104.

Figure 2:
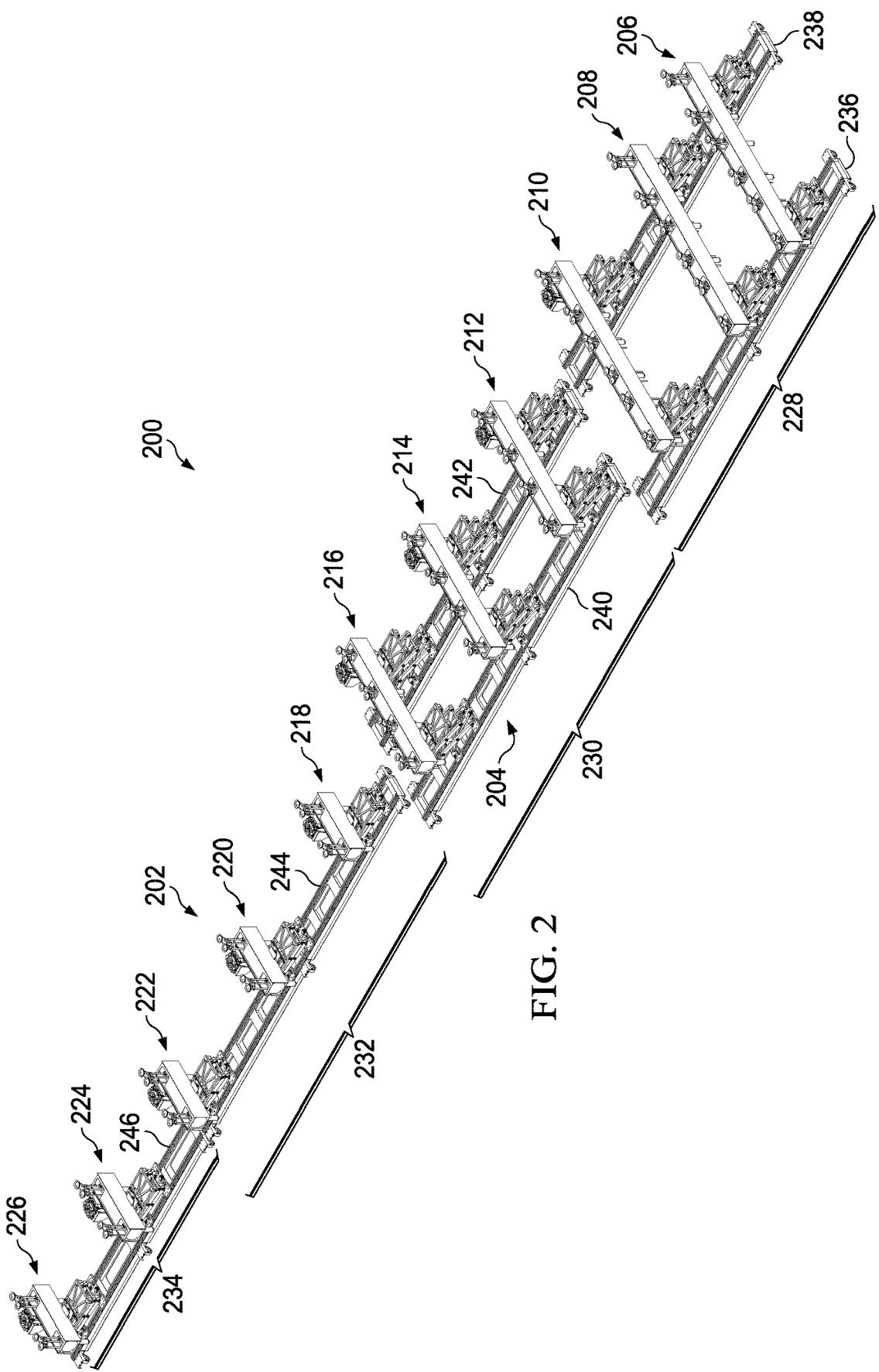
FIG. 2 is an illustration of an isometric view of a modular support system in accordance with an illustrative embodiment.

With reference now to FIG. 2, an illustration of an isometric view of a modular support system is depicted in accordance with an illustrative embodiment. In this illustrative example, modular support system 200 is an example of one implementation for modular support system 102 in FIG. 1.

As depicted, modular support system 102 may include number of support modules 202 and base 204. Number of support modules 202 and base 204 may be examples of implementations for number of support modules 114 and base 116, respectively, in FIG. 1.

In this illustrative example, number of support modules 202 includes support modules 206, 208, 210, 212, 214, 216, 218, 220, 222, 224, and 226. Each of these support modules may be an example of an implementation for support module 118 in FIG. 1.

Further, base 204 may be comprised of first track system 228, second track system 230, third track system 232, and fourth track system 234. First track system 228 may include track 236 and track 238. Second track system 230 may include track 240 and track 242. Third track system 232 may include track 244, and fourth track system 234 may include track 246. Number of support modules 202 may be positioned on these different tracks and allowed to move along these tracks.

Figure 3:
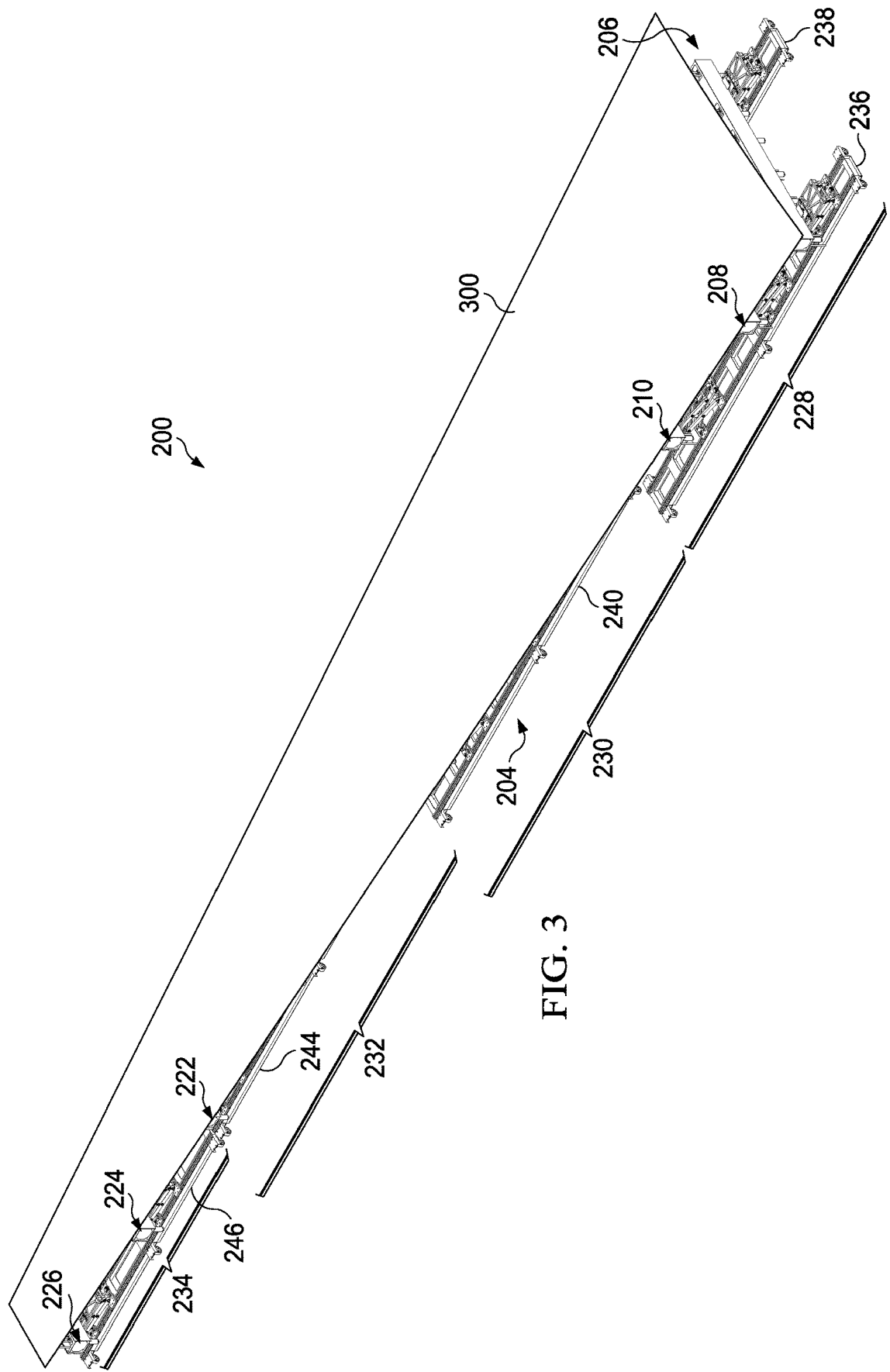
FIG. 3 is an illustration of a wing skin being supported by a modular support system in accordance with an illustrative embodiment.

With reference now to FIG. 3, an illustration of a wing skin being supported by modular support system 200 from FIG. 2 is depicted in accordance with an illustrative embodiment. In this illustrative example, wing skin 300 is being supported by modular support system 200. Wing skin 300 may be an example of one implementation for wing skin 112 in FIG. 1.

Figure 4:
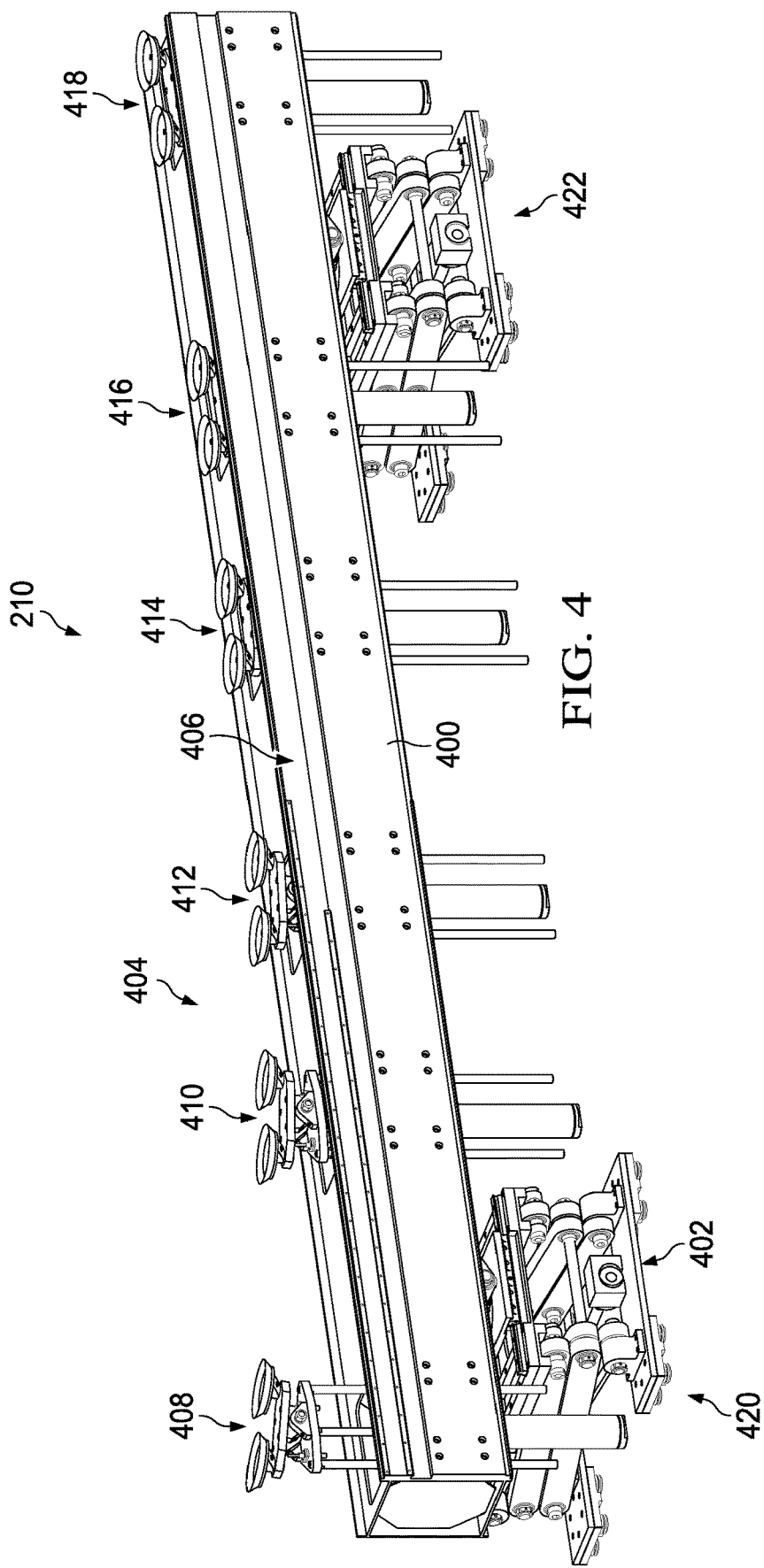
FIG. 4 is an illustration of an isometric view of a support module in accordance with an illustrative embodiment.

With reference now to FIG. 4, an illustration of an isometric view of support module 210 from FIG. 2 is depicted in accordance with an illustrative embodiment. As depicted, support module 210 may include support structure 400, positioning system 402, and retention system 404. Support structure 400, positioning system 402, and retention system 404 may be examples of implementations for support structure 122, positioning system 124, and retention system 126, respectively, in FIG. 1.

Both positioning system 402 and retention system 404 may be associated with support structure 400. Further, attachment system 406 may be associated with support structure 400. Attachment system 406 may be used to hold a tool, such as tool 148 in FIG. 1.

In this illustrative example, retention system 404 may include adhesion systems 408, 410, 412, 414, 416, and 418. These adhesion systems may be an example of one implementation for number of adhesion systems 128 in FIG. 1. Further, each of adhesion systems 408, 410, 412, 414, 416, and 418 may be an example of an implementation for adhesion system 130 in FIG. 1.

Positioning system 402 may include positioning assembly 420 and positioning assembly 422. Positioning assembly 420 and positioning assembly 422 may be examples of one implementation for number of positioning assemblies 138 in FIG. 1. Further, each of positioning assembly 420 and positioning assembly 422 may be an example of an implementation for positioning assembly 140 in FIG. 1.

Figure 5:
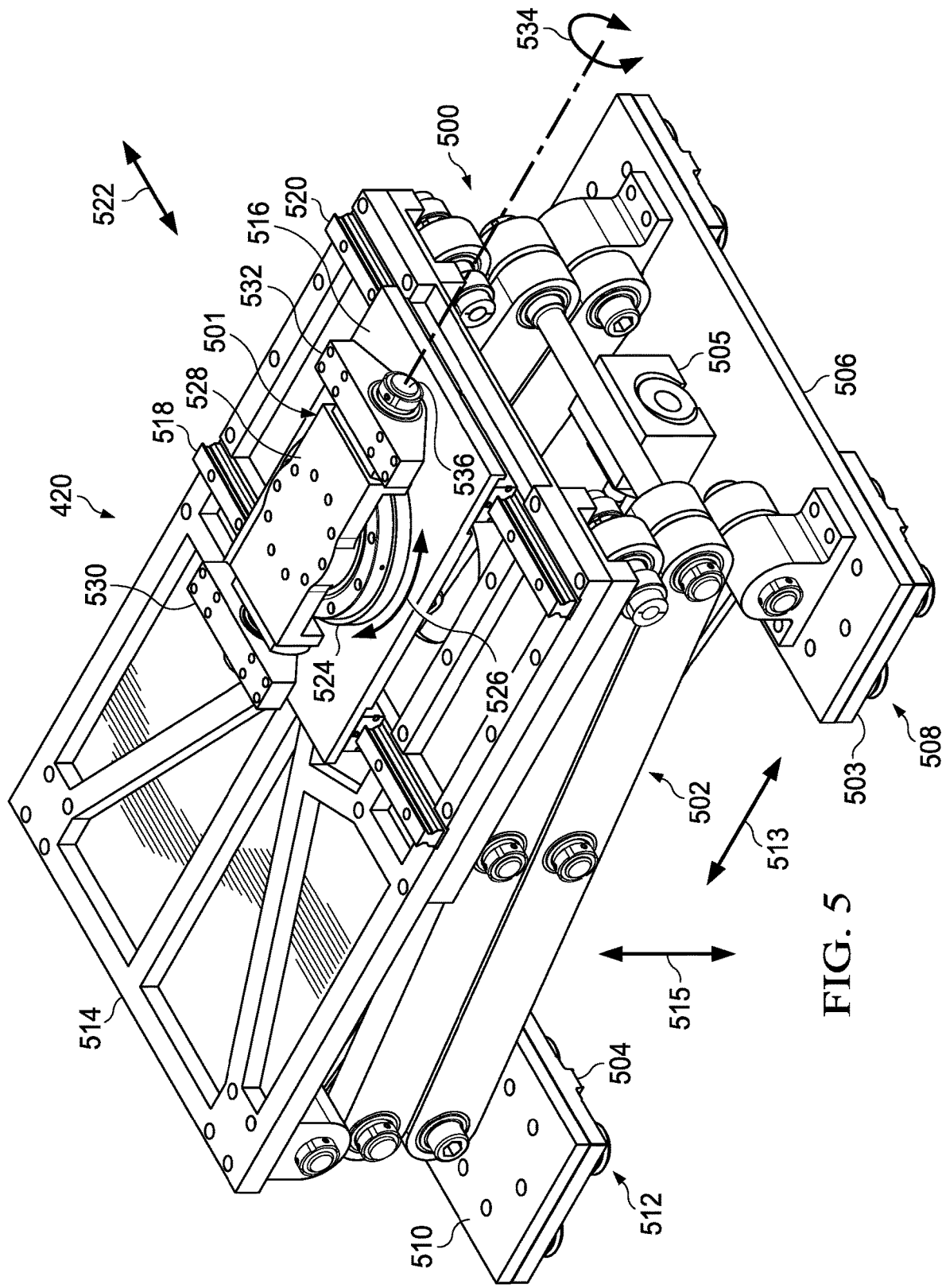
FIG. 5 is an illustration of a positioning assembly in accordance with an illustrative embodiment.

With reference now to FIG. 5, an illustration of positioning assembly 420 from FIG. 4 is depicted in accordance with an illustrative embodiment. In this illustrative example, positioning assembly 420 may include linear system 500 and rotational system 501. Linear system 500 and rotational system 501 may be examples of implementations for linear system 142 and rotational system 144, respectively, in FIG. 1.

As depicted, linear system 500 may include scissor lift 502, moveable base 503, moveable base 504, actuation system 505, and work platform 514. Moveable base 503 may include base structure 506 and plurality of rollers 508 attached to base structure 506. Moveable base 504 may include base structure 510 and plurality of rollers 512 attached to base structure 510. Plurality of rollers 508 and plurality of rollers 512 may be configured to move positioning assembly 420 along track 238 in FIG. 2 in a direction substantially parallel to X-axis 513.

Scissor lift 502 may be a type of moveable platform that can move vertically. In this illustrative example, scissor lift 502 may use linked, folding structures arranged in a crisscross pattern to form a scissor mechanism. Vertical motion in a direction substantially parallel to Z-axis 515 may be achieved by the application of pressure to moveable base 503 and moveable base 504.

Moveable base 503 and moveable base 504 may be moved towards each other or away from each other using actuation system 505. Moving moveable base 503 and moveable base 504 towards each other may cause the crisscross pattern to be elongated and work platform 514 to be moved upwards vertically. Moving moveable base 503 and moveable base 504 away from each other may cause the crisscross pattern to be contracted and work platform 514 to be moved downwards vertically. In this manner, vertical motion of scissor lift 502 may be achieved. Of course, in other illustrative examples, scissor lift 502 may be operated and actuated in some other manner.

Actuation system 505 may be implemented in a number of different ways. Actuation system 505 may include, for example, without limitation, at least one of a hydraulic actuator, a pneumatic actuator, a mechanical actuation device, an electrical actuation device, or some other type of actuation device.

Linear system 500 may also include sliding platform 516, rail 518, and rail 520. Rail 518 and rail 520 may be attached to work platform 514. Sliding platform 516 may be configured to slide along rail 518 and rail 520 in either direction along Y-axis 522 in this illustrative example. X-axis 513, Z-axis 515, and Y-axis 522 may be examples of axes in number of linear axes 134 in FIG. 1.

Rotational system 501 may be associated with sliding platform 516. Rotational system 501 may include rotating device 524 configured to rotate along a rotational axis substantially concentric to C-axis 526. Rotational system 501 may also include attachment plate 528 and a number of tilting elements, which may include tilting element 530 and tilting element 532. Tilting element 530 and tilting element 532 may be configured to rotate along a rotational axis substantially concentric to A-axis 534 about pivot element 536.

In this illustrative example, support structure 400 from FIG. 4 may be attached to positioning assembly 420 by attaching to tilting element 530 and tilting element 532. Tilting element 530 and tilting element 532 may be associated with rotating device 524 through attachment plate 528. Rotation of rotating device 524 may also cause attachment plate 528, and thereby tilting element 530 and tilting element 532, to rotate. However, rotation of tilting element 530 and tilting element 532 may not cause any rotation of rotating device 524. In this manner, tilting element 530 and tilting element 532 may be configured to move independently of rotating device 524.

Further, any linear movement by linear system 500 may affect rotational system 501. However, rotational movement by rotational system 501 may not affect linear system 500. For example, without limitation, any movement along X-axis 513, Y-axis 522, and/or Z-axis 515, as described above, may cause rotational system 501 to be moved in the same direction. However, any movement along C-axis 526 and/or A-axis 534 may not cause linear system 500 to be moved in any direction. Movement along C-axis 526 or A-axis 534 may be considered rotational movement.

Figure 6:
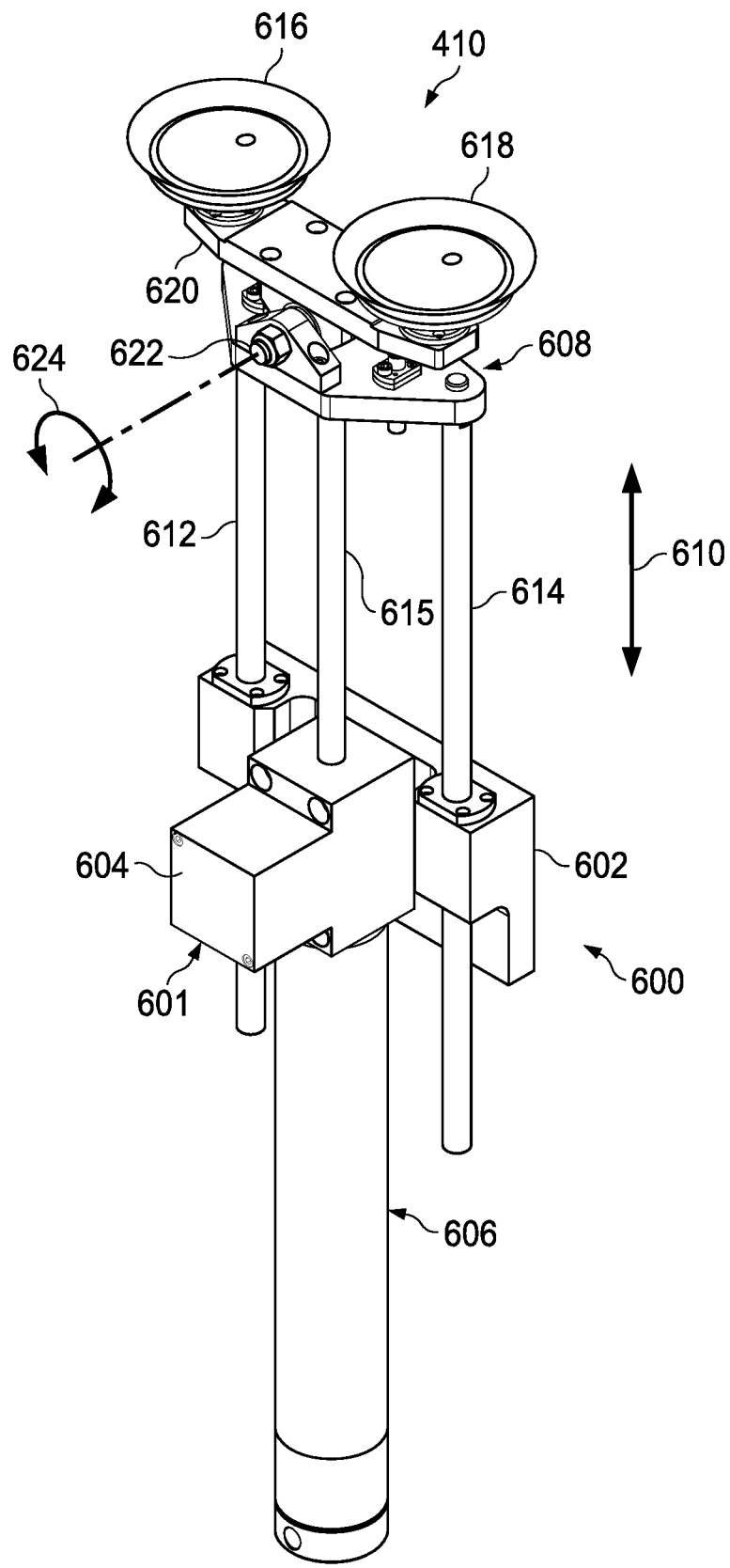
FIG. 6 is an illustration of an isometric view of an adhesion system in accordance with an illustrative embodiment.

With reference now to FIG. 6, an illustration of an isometric view of adhesion system 410 from FIG. 4 is depicted in accordance with an illustrative embodiment. In this illustrative example, adhesion system 410 may take the form of suction cup system 600. Suction cup system 600 may be an example of one implementation for suction cup system 132 in FIG. 1.

As depicted, suction cup system 600 may include attachment structure 601 used to attach suction cup system 600 to support structure 400 in FIG. 4. In this illustrative example, attachment structure 601 may include element 602 and element 604.

Further, suction cup system 600 may also include actuation system 606. Actuation system 606 may be configured to move stabilizing structure 608 in a direction along arrow 610. Arrow 610 may be substantially parallel to Z-axis 515 seen in FIG. 5. Actuation system 606 may include any number of actuation devices.

Suction cup system 600 may also include elongate member 612 and elongate member 614. These elongate members may be alignment rods used to ensure that stabilizing structure 608 remains stable during vertical motion in a direction along arrow 610. Operation of actuation system 606 may cause elongate member 612, elongate member 614, and elongate member 615 associated with actuation system 606 to move stabilizing structure 608 upwards or downwards.

As depicted, suction cup 616 and suction cup 618 may be attached to tilting plate 620. Tilting plate 620 may be associated with stabilizing structure 608. Tilting plate 620 may be rotated in a direction along arrow 624 about pivot element 622. Movement along arrow 624 may be rotational movement. In this manner, tilting plate 620 may be tilted. In this illustrative example, arrow 624 may be substantially concentric to A-axis 534 in FIG. 5. When tilting plate 620 is rotated, the orientation of suction cup 616 and suction cup 618 may be changed.

In particular, suction cup 616 and suction cup 618 may have spherical bearing interfaces (not shown in this view) with tilting plate 620. These spherical bearing interfaces may allow suction cup 616 and suction cup 618 to tilt relative to each other to ensure that suction cup 616 and suction cup 618 remain substantially aligned with wing skin 300 in FIG. 3 even when tilting plate 620 is rotated.

Figure 7:
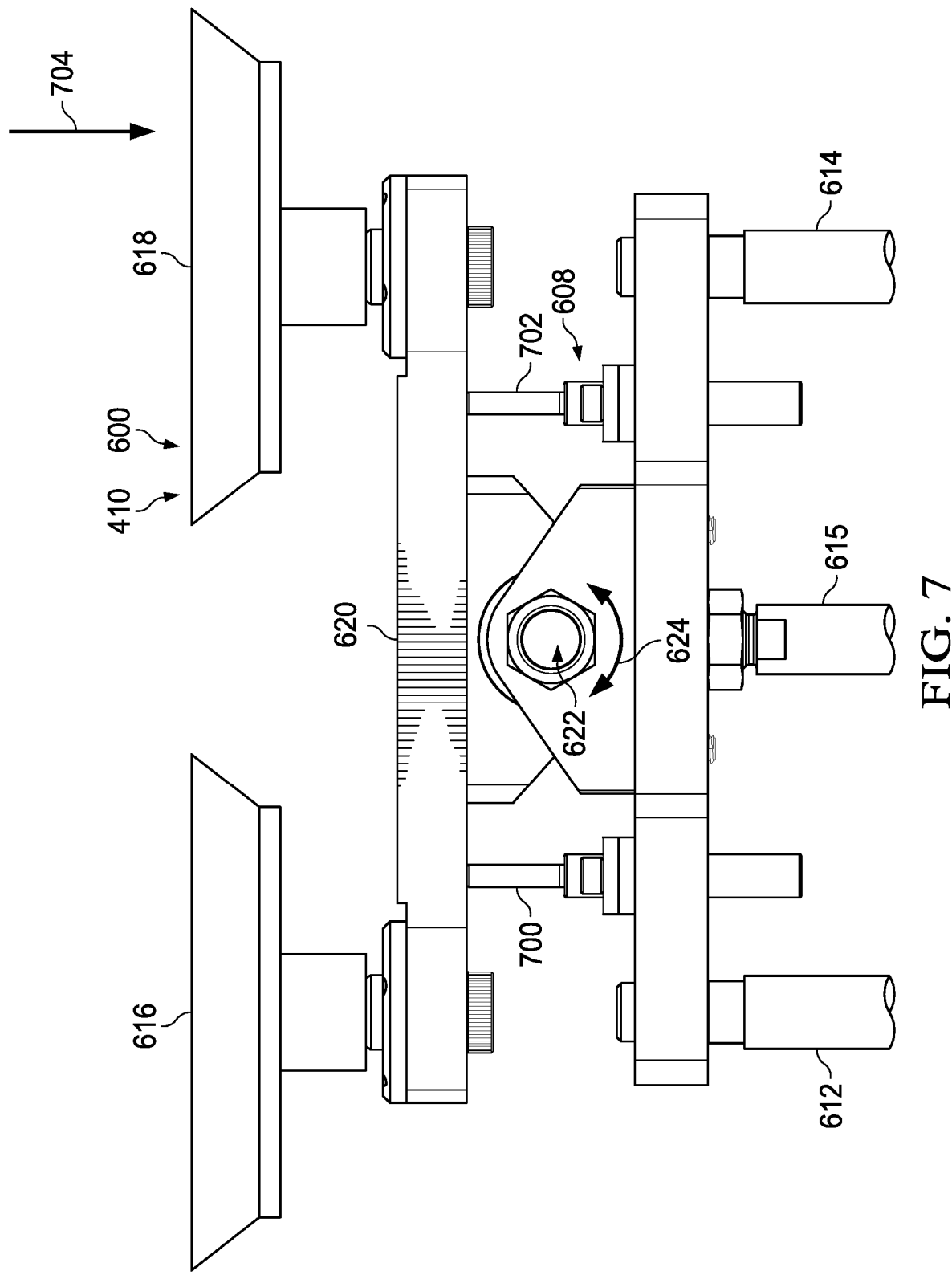
FIG. 7 is an illustration of a portion of an adhesion system in accordance with an illustrative embodiment.

With reference now to FIG. 7, an illustration of a portion of adhesion system 410 from FIG. 4 is depicted in accordance with an illustrative embodiment. In this illustrative example, suction cup 616 and suction cup 618 may be in a centered position. In particular, tilting plate 620 may not be tilted.

In this illustrative example, gas spring 700 and gas spring 702 may be associated with tilting plate 620. Gas spring 700 and gas spring 702 may be configured to compress in response to pressure or force. For example, without limitation, force may be applied to suction cup 618 in the direction of arrow 704, which may cause gas spring 702 to compress. When gas spring 702 compresses, tilting plate 620 may rotate about pivot element 622 towards gas spring 702.

In one illustrative example, actuation system 606 from FIG. 6 may be configured to move suction cup 616 and suction cup 618 upwards until the portion of wing skin 300 from FIG. 3 retained by these suction cups encounters the lower side of a wing box (not shown). In other words, actuation system 606 may be used to apply force to wing skin 300 such that wing skin 300 is moved towards the wing box.

Actuation system 606 from FIG. 6 may continue to move these suction cups upwards until the portion of wing skin 300 retained by the suction cups substantially conforms to the portion of the wing box being encountered. When the lower side of the wing box encountered has a curved shape, the bending or curving of wing skin 300 to conform to the shape of the portion of the wing box may cause at least one of gas spring 700 or gas spring 702 to compress. This compression may allow tilting plate 620 to tilt such that the portion of wing skin 300 being retained by suction cup 616 and suction cup 618 may substantially conform to this curved shape.

Figure 8:
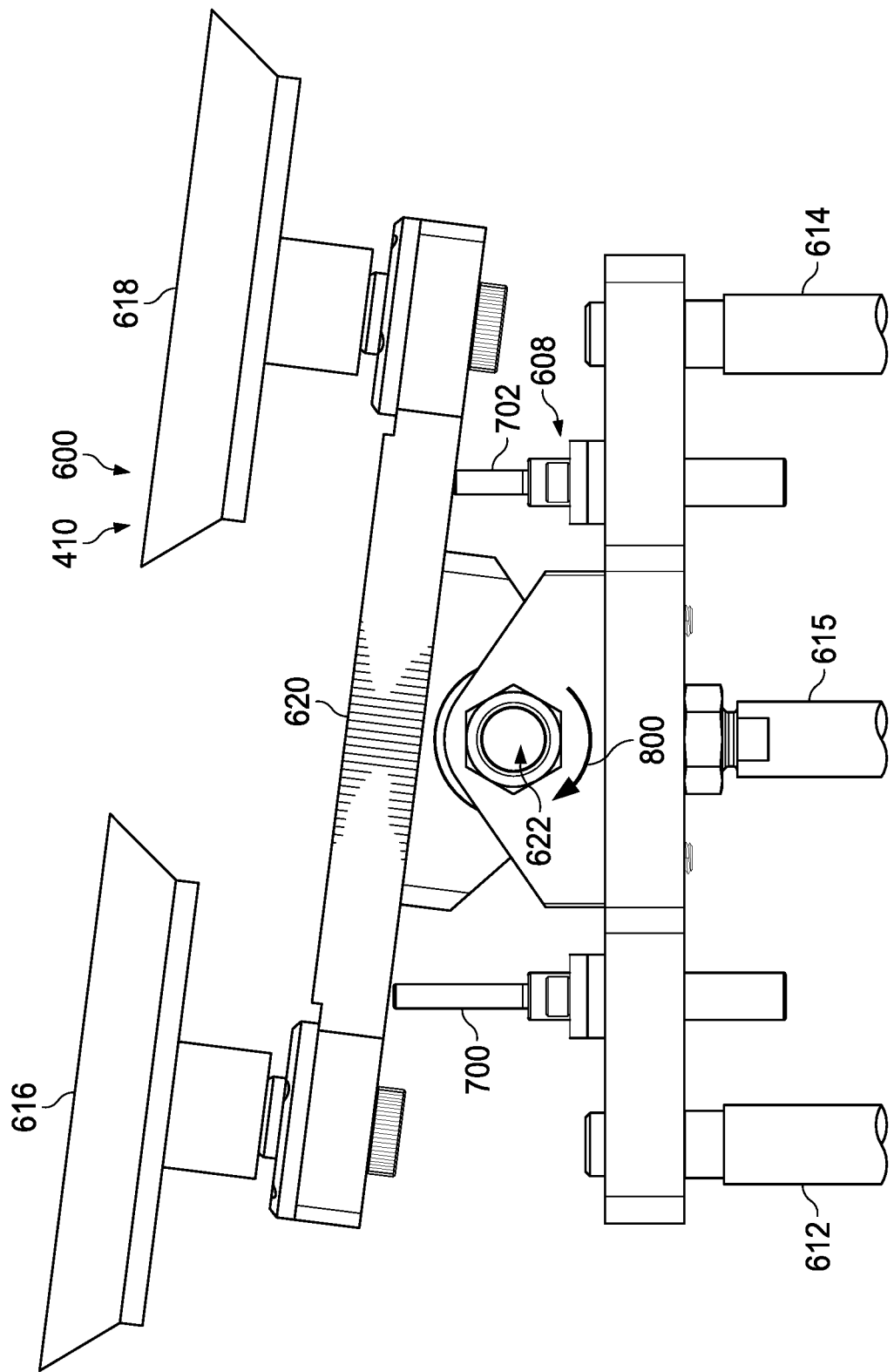
FIG. 8 is an illustration of a tilting plate of an adhesion system being tilted in accordance with an illustrative embodiment.

Turning now to FIG. 8, an illustration of tilting plate 620 of adhesion system 410 from FIG. 6 being tilted is depicted in accordance with an illustrative embodiment. In this illustrative example, tilting plate 620 has tilted in the direction of arrow 800. Consequently, the orientation of suction cup 616 and suction cup 618 may be changed.

Figure 9:
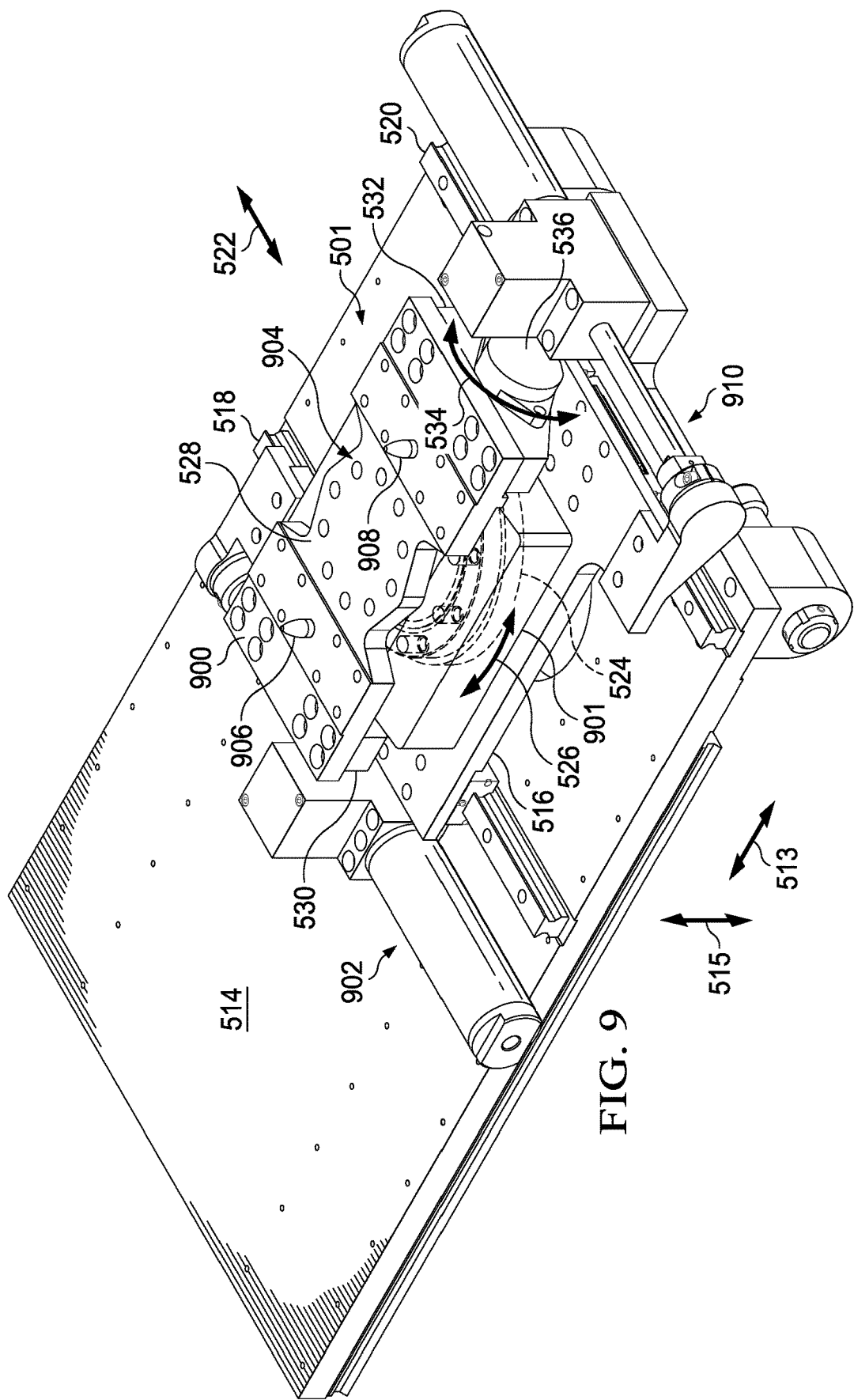
FIG. 9 is an illustration of a portion of a positioning assembly in accordance with an illustrative embodiment.

With reference now to FIG. 9, an illustration of a portion of positioning assembly 420 from FIG. 5 is depicted in accordance with an illustrative embodiment. In this illustrative example, attachment plate 900, housing 901, and centering system 902 may be added to positioning assembly 420.

Attachment plate 900 may be attached to tilting element 530 or tilting element 532. Tilting element 530 and tilting element 530 may be attached to housing 901. Housing 901 may be used to house rotating device 524 (shown in phantom). Attachment plate 900 may have plurality of holes 904, protruding member 906, and protruding member 908. Attachment plate 900 may be configured to allow different types of support structures to be attached to rotational system 501.

Centering system 902 may be used to center sliding platform 516 along rail 518 and rail 520. In this illustrative example, sliding platform 516 has been moved to center position 910. Center position along rail 518 and rail 520 may be a neutral position, or default position, for sliding platform 516.

Figure 10:
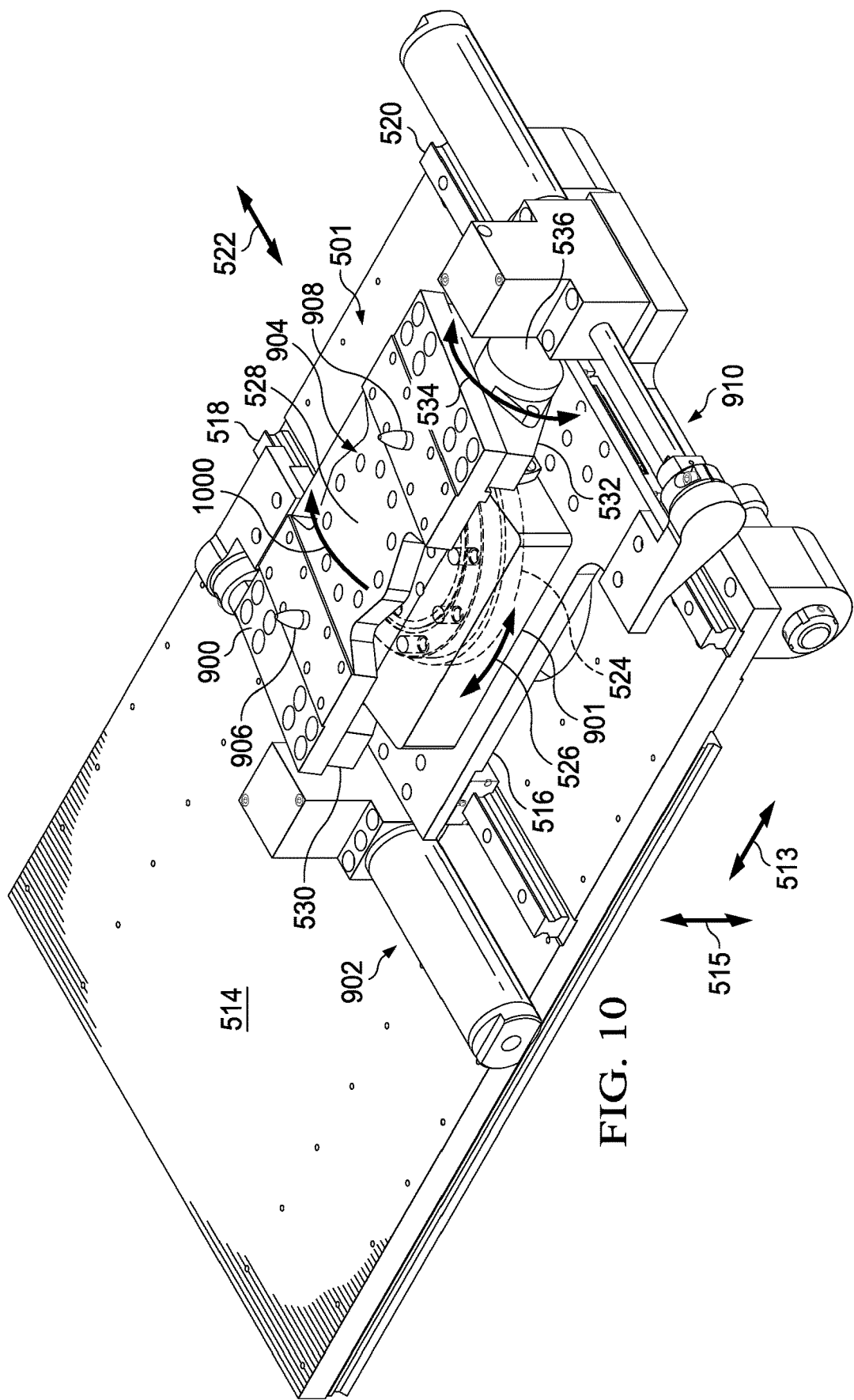
FIG. 10 is an illustration of an attachment plate being tilted in accordance with an illustrative embodiment.

Turning now to FIG. 10, an illustration of attachment plate 900 from FIG. 9 being tilted is depicted in accordance with an illustrative embodiment. In this illustrative example, attachment plate 900 has been tilted in the direction of arrow 1000. In particular, tilting element 530 and tilting element 532 have rotated about pivot element 536 in the direction of arrow 1000, which in turn, may cause rotation of attachment plate 900 in the direction of arrow 1000.

Figure 11:
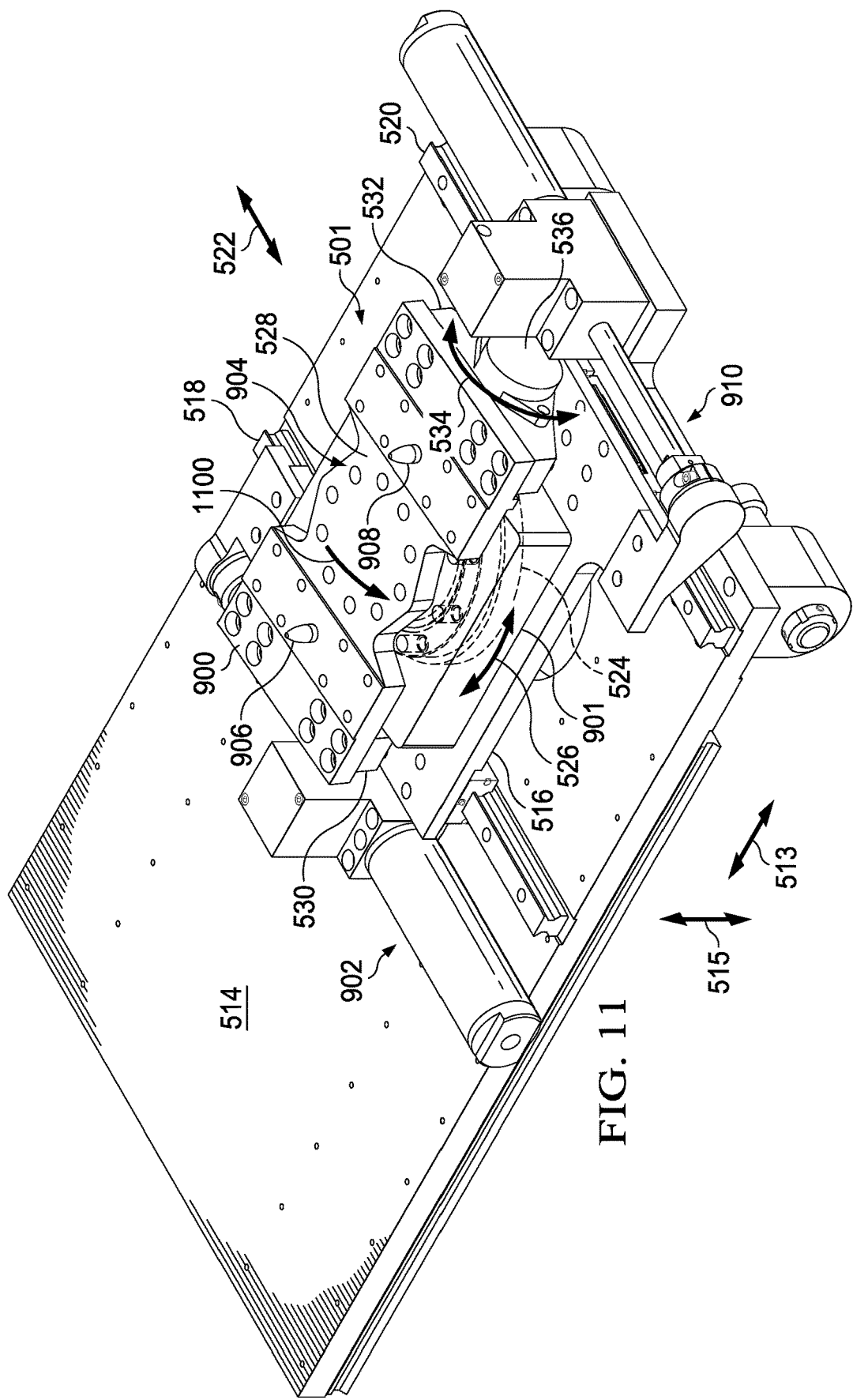
FIG. 11 is an illustration of an attachment plate being tilted in accordance with an illustrative embodiment.

With reference now to FIG. 11, an illustration of attachment plate 900 from FIG. 9 being tilted is depicted in accordance with an illustrative embodiment. In this illustrative example, attachment plate 900 has been tilted in the direction of arrow 1100.

Figure 12:
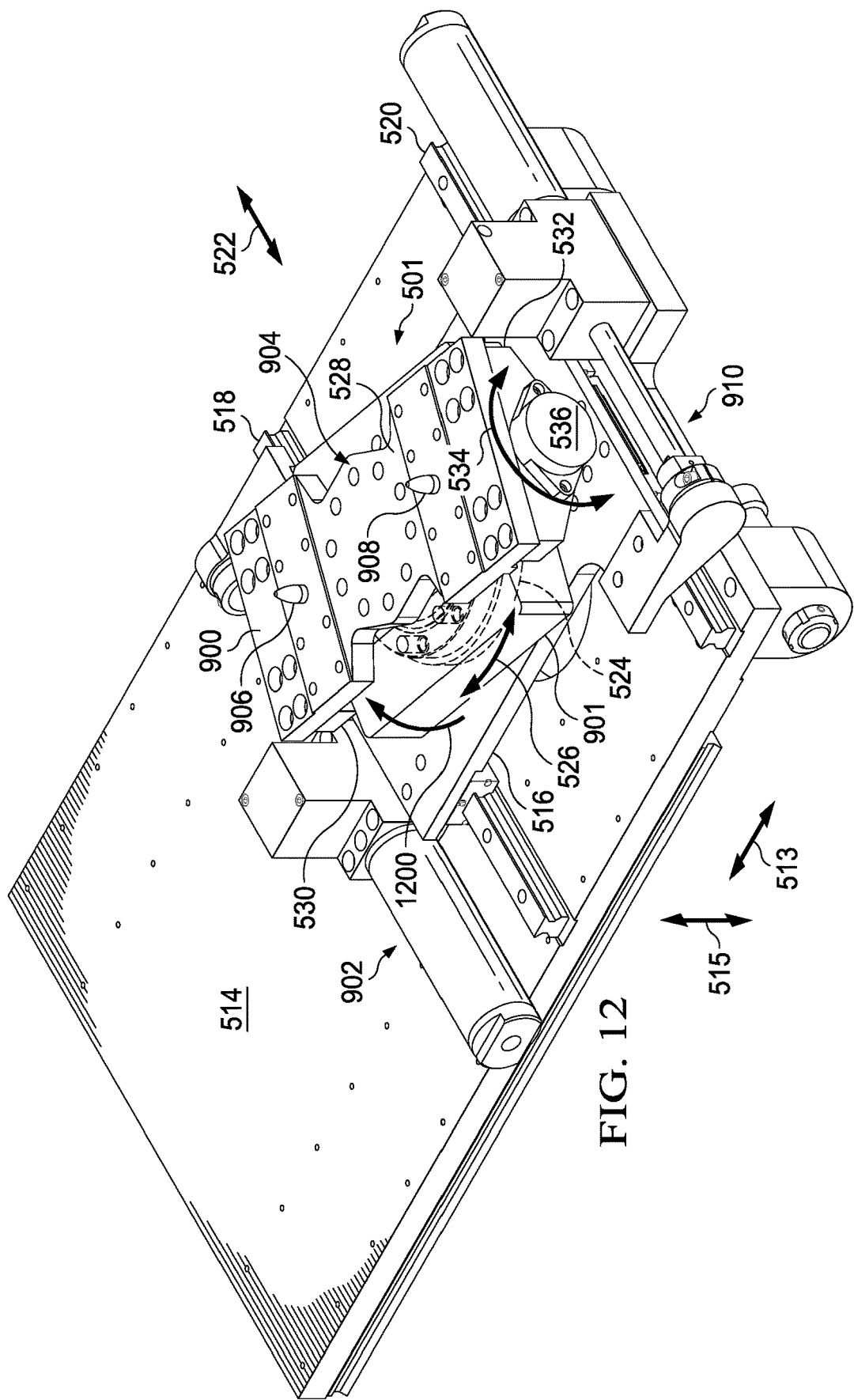
FIG. 12 is an illustration of an attachment plate being rotated in accordance with an illustrative embodiment.

With reference now to FIG. 12, an illustration of attachment plate 900 from FIG. 9 being rotated is depicted in accordance with an illustrative embodiment. In this illustrative example, attachment plate 900 has been rotated in the direction of arrow 1200. In particular, rotating device 524 and housing 901 have rotated in the direction of arrow 1200, which in turn, may cause rotation of attachment plate 900 in the direction of arrow 1200.

Figure 13:
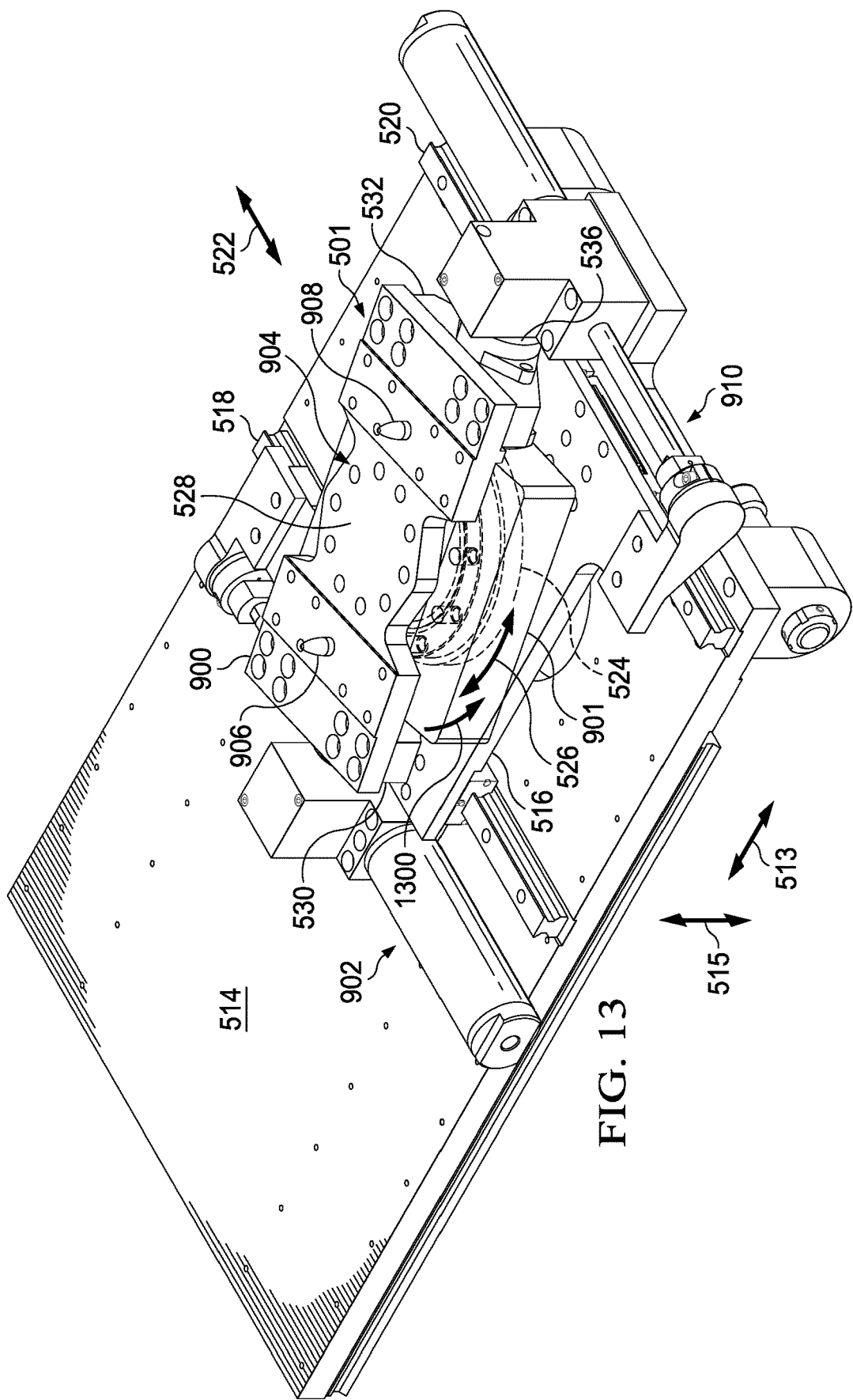
FIG. 13 is an illustration of an attachment plate being rotated in accordance with an illustrative embodiment.

With reference now to FIG. 13, an illustration of attachment plate 900 from FIG. 9 being rotated is depicted in accordance with an illustrative embodiment. In this illustrative example, attachment plate 900 has been rotated in the direction of arrow 1300.

Figure 14:
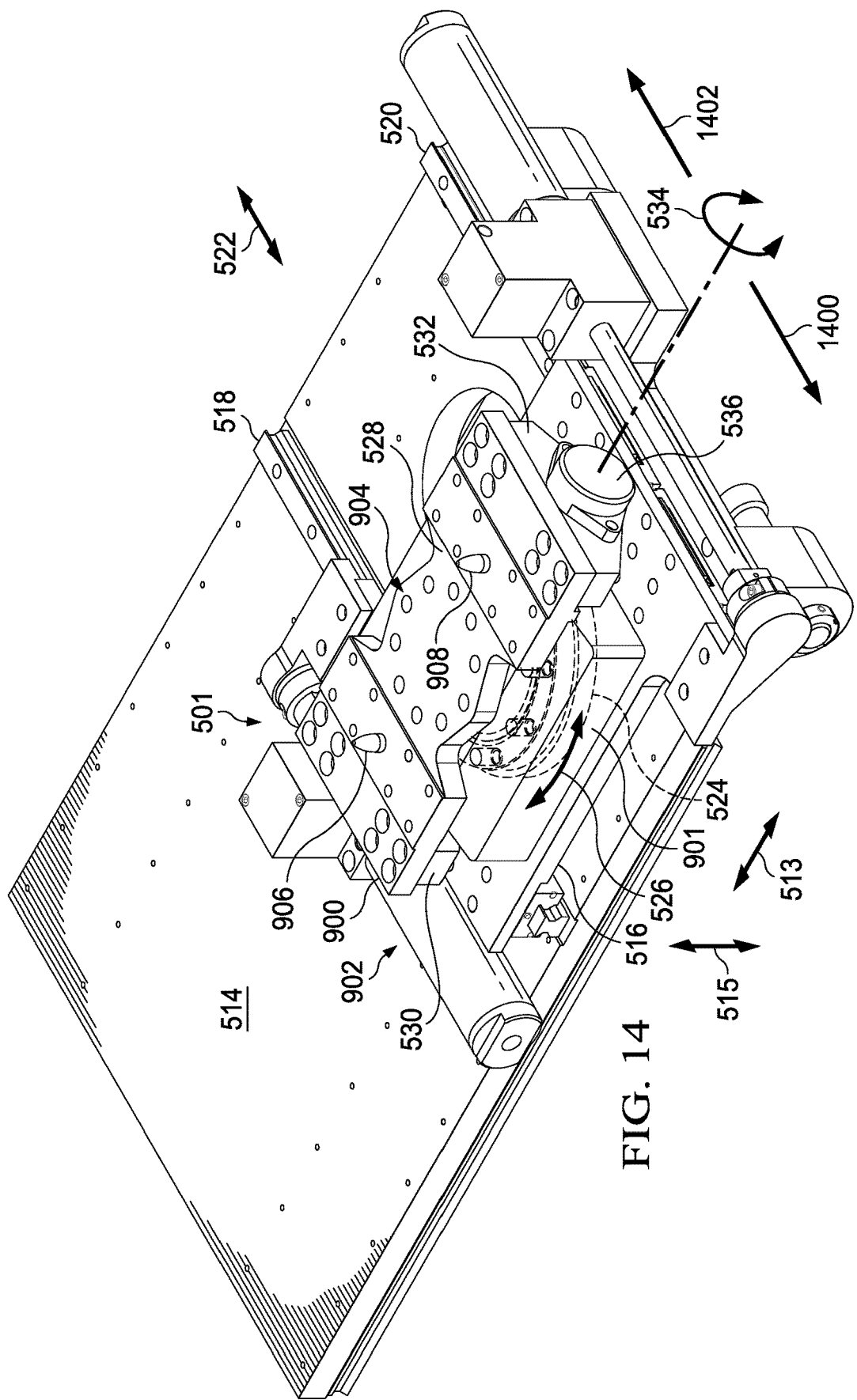
FIG. 14 is an illustration of a sliding platform being moved in accordance with an illustrative embodiment.

With reference now to FIG. 14, an illustration of sliding platform 516 from FIG. 9 being moved is depicted in accordance with an illustrative embodiment. In this illustrative example, sliding platform 514 has been moved in the direction of arrow 1400. Centering system 902 may be used to move sliding platform 516 in the direction of arrow 1402 back to center position 910 in FIG. 9.

Figure 15:
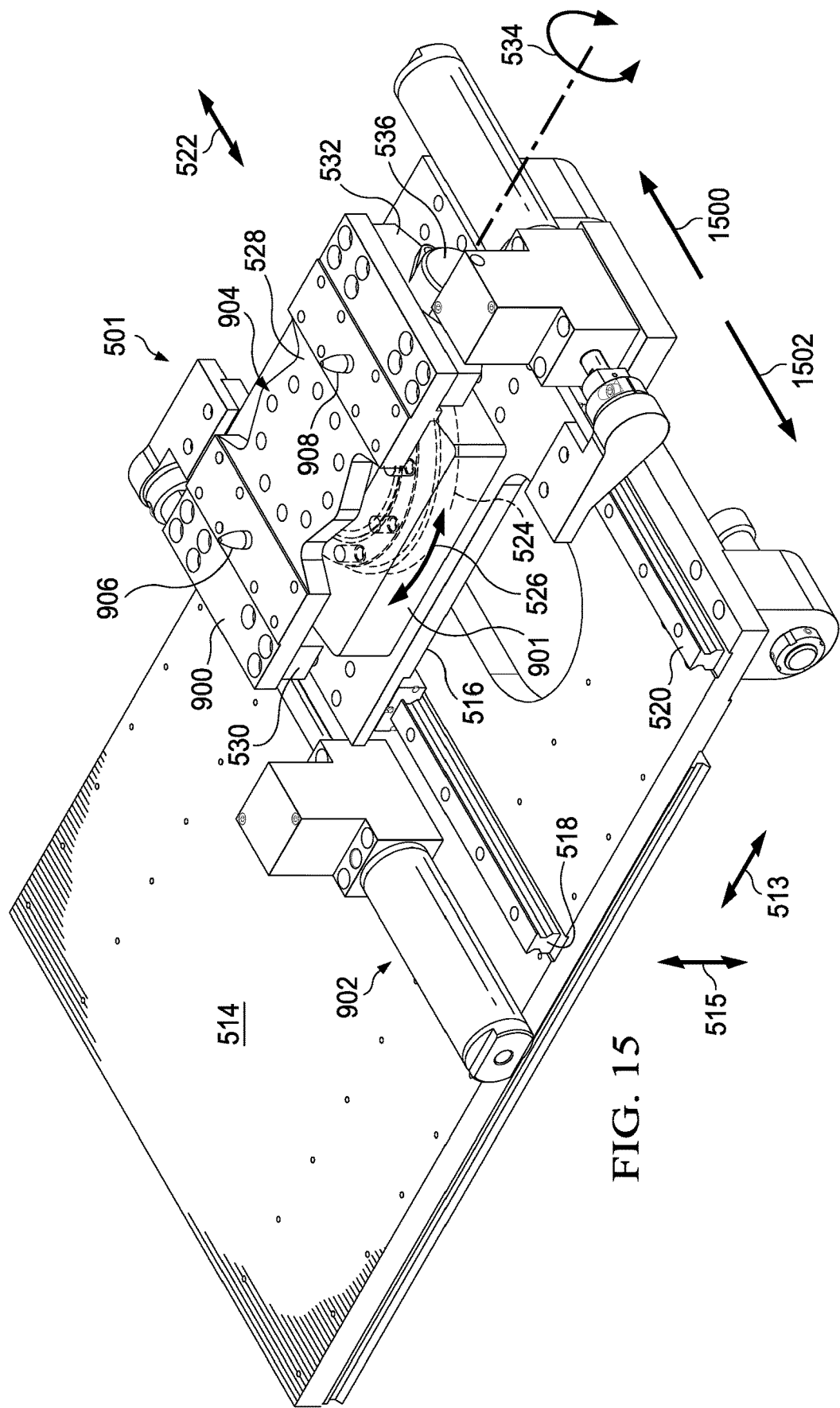
FIG. 15 is an illustration of a sliding platform being moved in accordance with an illustrative embodiment.

With reference now to FIG. 15, an illustration of sliding platform 516 from FIG. 9 being moved is depicted in accordance with an illustrative embodiment. In this illustrative example, sliding platform 514 has been moved in the direction of arrow 1500. Centering system 902 may be used to move sliding platform 516 in the direction of arrow 1502 back to center position 910 in FIG. 9.

Figure 16:
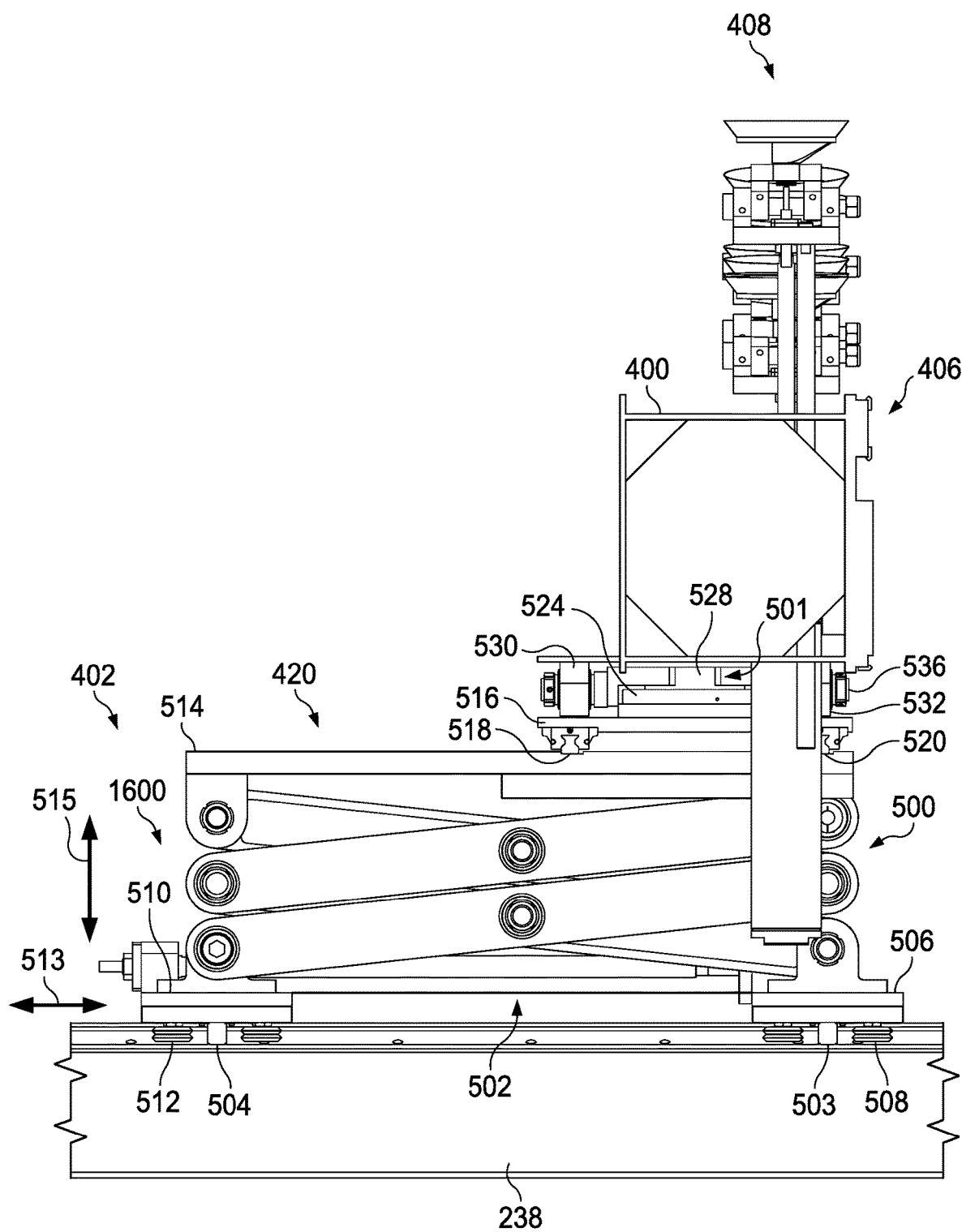
FIG. 16 is an illustration of a side view of a support module in accordance with an illustrative embodiment.

Turning now to FIG. 16, an illustration of a side view of support module 210 from FIG. 4 is depicted in accordance with an illustrative embodiment. In this illustrative example, scissor lift 502 may be in contracted state 1600. In contracted state 1600, the crisscross pattern of scissor lift 502 may be fully contracted.

Figure 17:
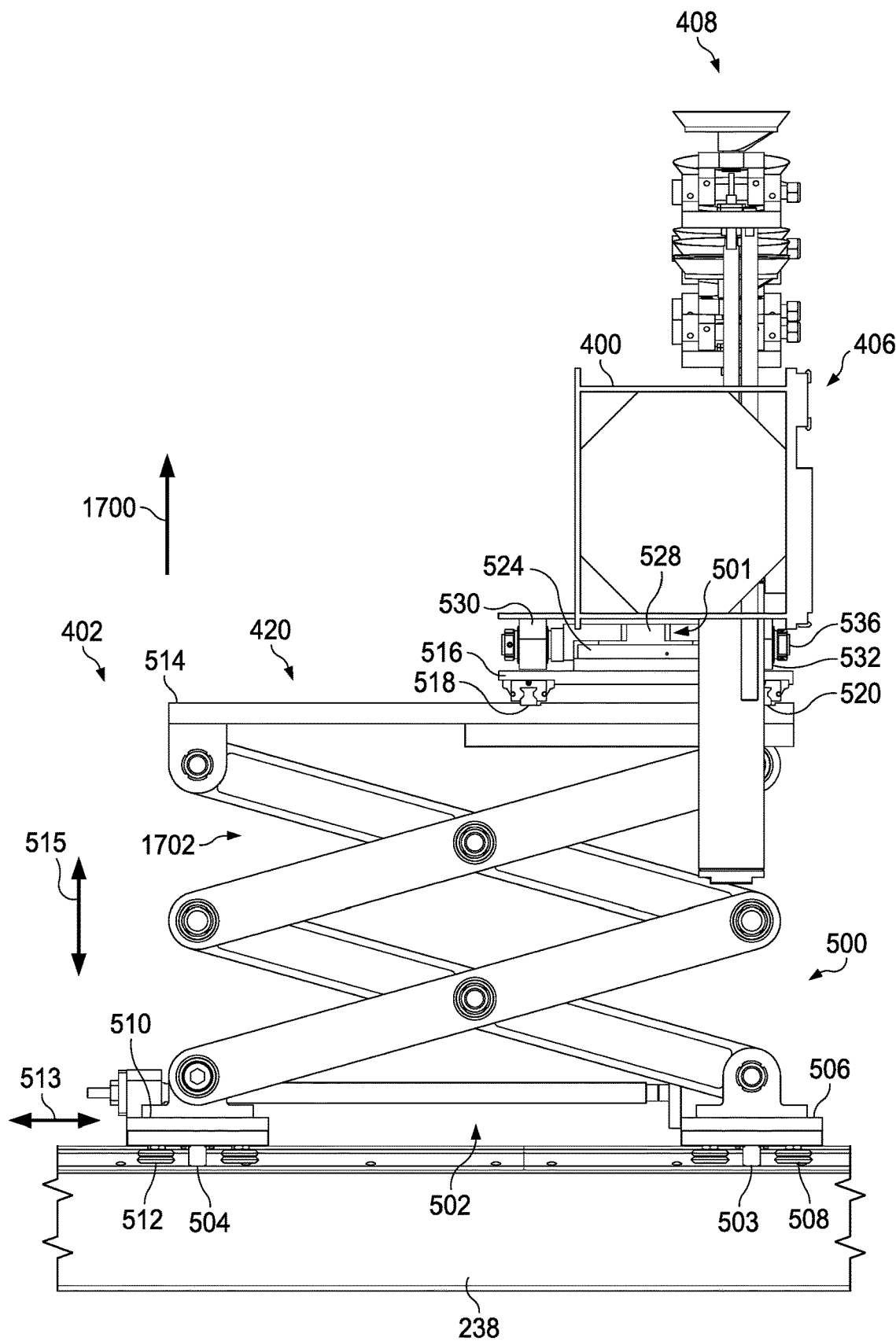
FIG. 17 is an illustration of a side view of a support module in accordance with an illustrative embodiment.

With reference now to FIG. 17, an illustration of a side view of support module 210 from FIG. 4 is depicted in accordance with an illustrative embodiment. In this illustrative example, scissor lift 502 has been elongated in the direction of arrow 1700 to move scissor lift 502 into elongated state 1702. In particular, the crisscross pattern of scissor lift 502 has been elongated to move scissor lift 502 into elongated state 1702. In elongated state 1702, work platform 514 may be raised higher than the position of work platform 514 when scissor lift 502 is in contracted state 1600 from FIG. 16.

Figure 18:
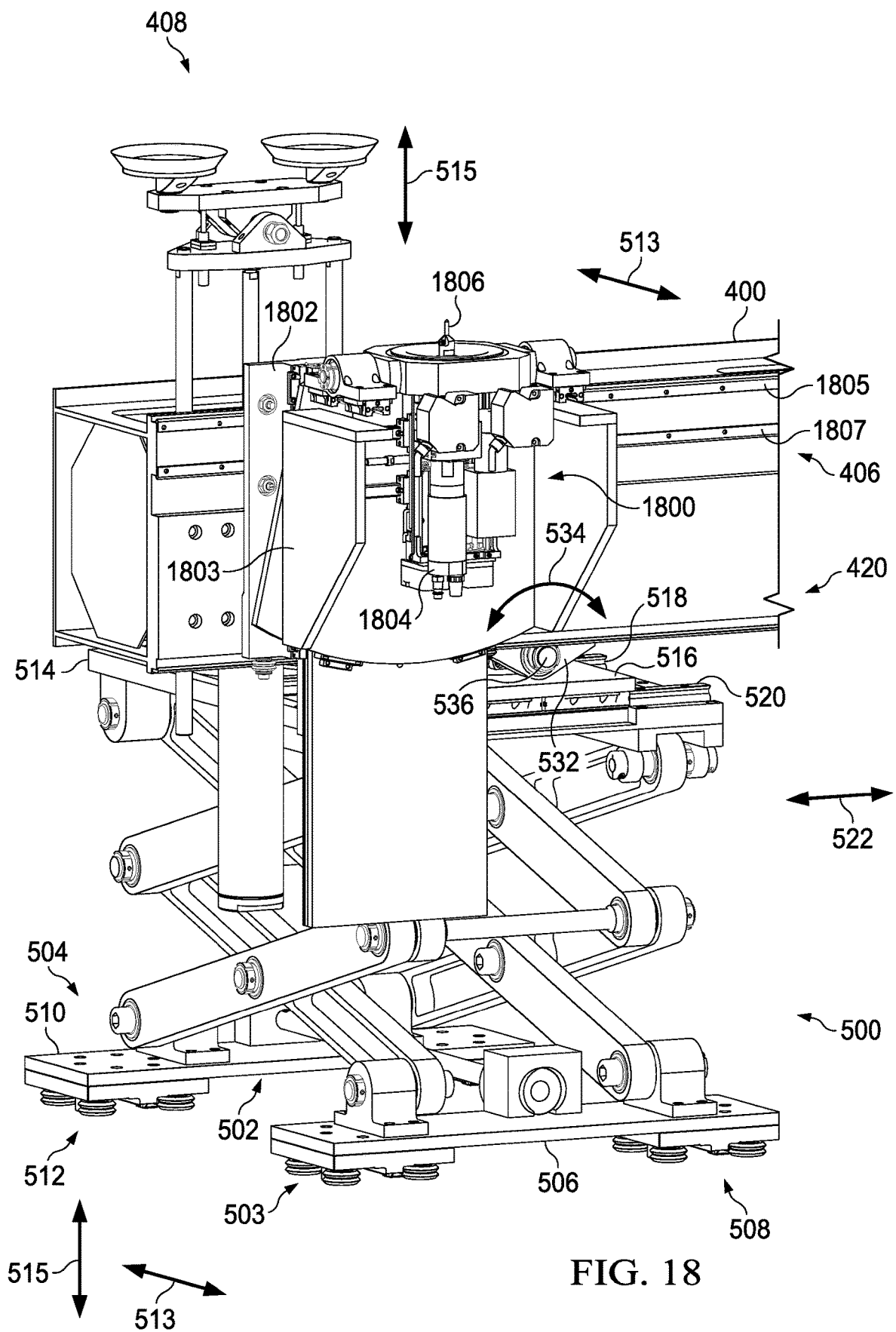
FIG. 18 is an illustration of an automated tool attached to a support module in accordance with an illustrative embodiment.

With reference now to FIG. 18, an illustration of an automated tool attached to support module 210 from FIG. 2 is depicted in accordance with an illustrative embodiment. In this illustrative example, automated tool 1800 has been attached to support structure 400 of support module 210 using attachment system 406. Automated tool 1800 may be an example of one implementation for automated tool 150 in FIG. 1.

As depicted, automated tool 1800 may include attachment structure 1802, positioning system 1803, and drilling device 1804. Drilling device 1804 may include drill bit 1806 for forming holes.

In this illustrative example, attachment structure 1802 may be used to attach automated tool 1800 to attachment system 406. In particular, attachment structure 1802 may be used to attach automated tool 1800 to rail 1805 and 1807 of attachment system 406. In this manner, automated tool 1800 may be allowed to move along rail 1805 and rail 1807 in a direction substantially parallel to Y-axis 522.

Further, positioning system 1803 may be used to move drilling device 1804 in a direction substantially parallel to X-axis 513 and/or Z-axis 515. In some cases, positioning system 1803 may be used to rotate drilling device 1804 about any number of rotational axes.

Figure 19:
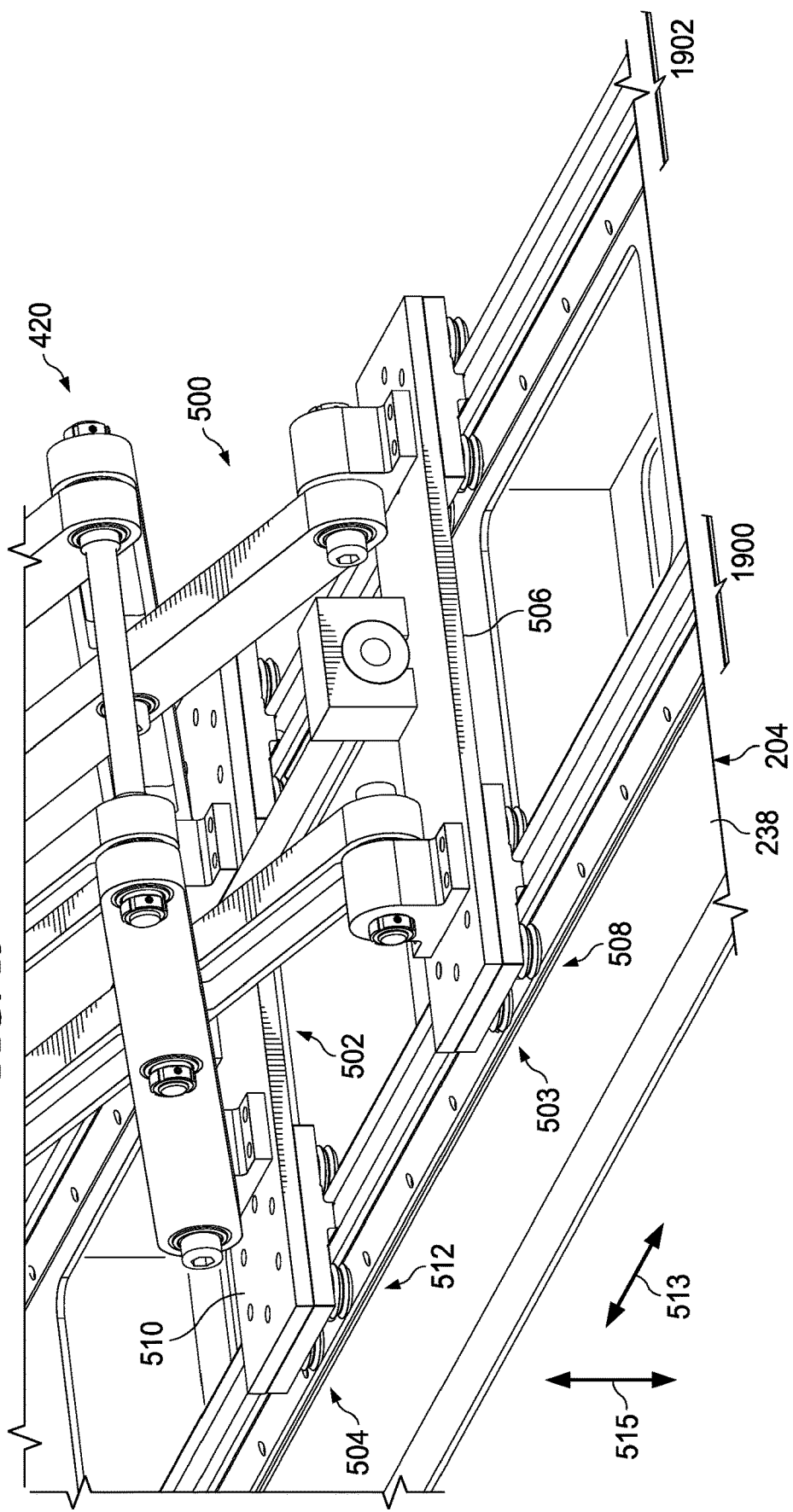
FIG. 19 is an illustration of an enlarged view of two moveable bases associated with a base in accordance with an illustrative embodiment.

With reference now to FIG. 19, an illustration of an enlarged view of moveable base 503 and moveable base 504 from FIG. 5 associated with base 204 from FIG. 2 is depicted in accordance with an illustrative embodiment. In this illustrative example, plurality of rollers 508 and plurality of rollers 512 may be retained with first portion 1900 of track 238 and second portion 1902 of track 238. Plurality of rollers 508 and plurality of rollers 512 may allow positioning assembly 420 to be moved along track 238 in a direction substantially parallel to X-axis 513.

The illustrations of modular support system 200 in FIGS. 2-3, support module 210 in FIG. 4 and FIGS. 16-19, positioning assembly 420 in FIG. 5 and FIGS. 9-15, adhesion system 410 in FIGS. 6-8, are not meant to imply physical or architectural limitations to the manner in which an illustrative embodiment may be implemented. Other components in addition to or in place of the ones illustrated may be used. Some components may be optional.

The different components shown in FIGS. 2-19 may be illustrative examples of how components shown in block form in FIG. 1 can be implemented as physical structures. Additionally, some of the components in FIGS. 2-19 may be combined with components in FIG. 1, used with components in FIG. 1, or a combination of the two.

Figure 20:
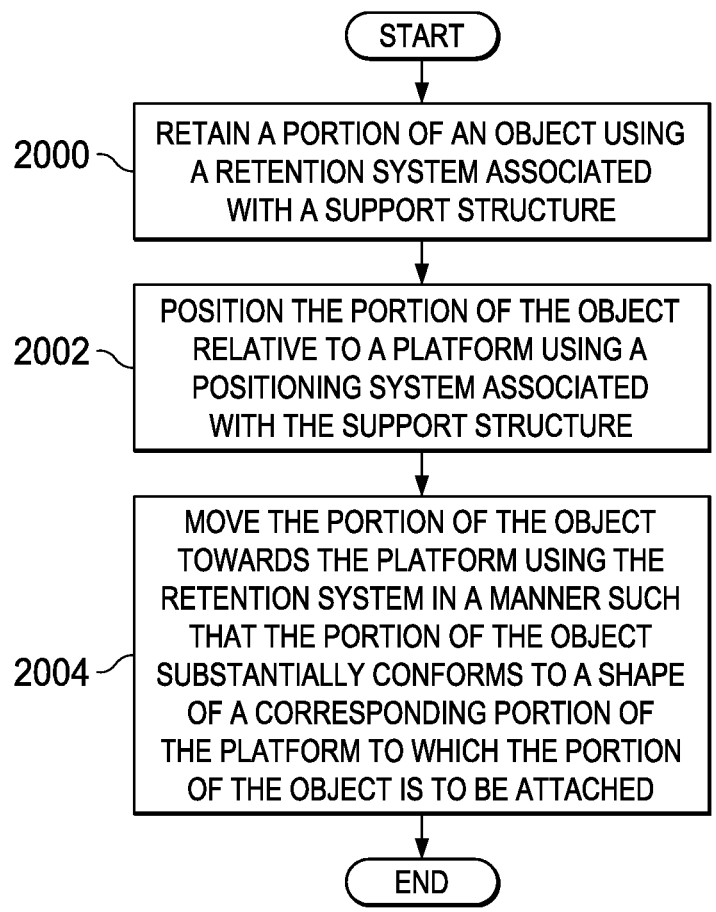
FIG. 20 is an illustration of a process for supporting an object in the form of a flowchart in accordance with an illustrative embodiment.

With reference now to FIG. 20, an illustration of a process for supporting an object is depicted in the form of a flowchart in accordance with an illustrative embodiment. The process illustrated in FIG. 20 may be implemented using modular support system 102 in FIG. 1 to support object 104 from FIG. 1. In particular, the process may be implemented using support module 118 in FIG. 1.

In this illustrative example, portion 120 of object 104 may be retained using retention system 126 associated with support structure 122 (operation 2000). Portion 120 of object 104 may then be positioned relative to platform 108 using positioning system 124 associated with support structure 122 (operation 2002). Thereafter, portion 120 of object 104 may be moved towards platform 108 using retention system 126 in a manner such that portion 120 of object 104 substantially conforms to a shape of a corresponding portion of platform 108 to which portion 120 of object 104 is to be attached (operation 2004), with the process terminating thereafter.

Figure 21:
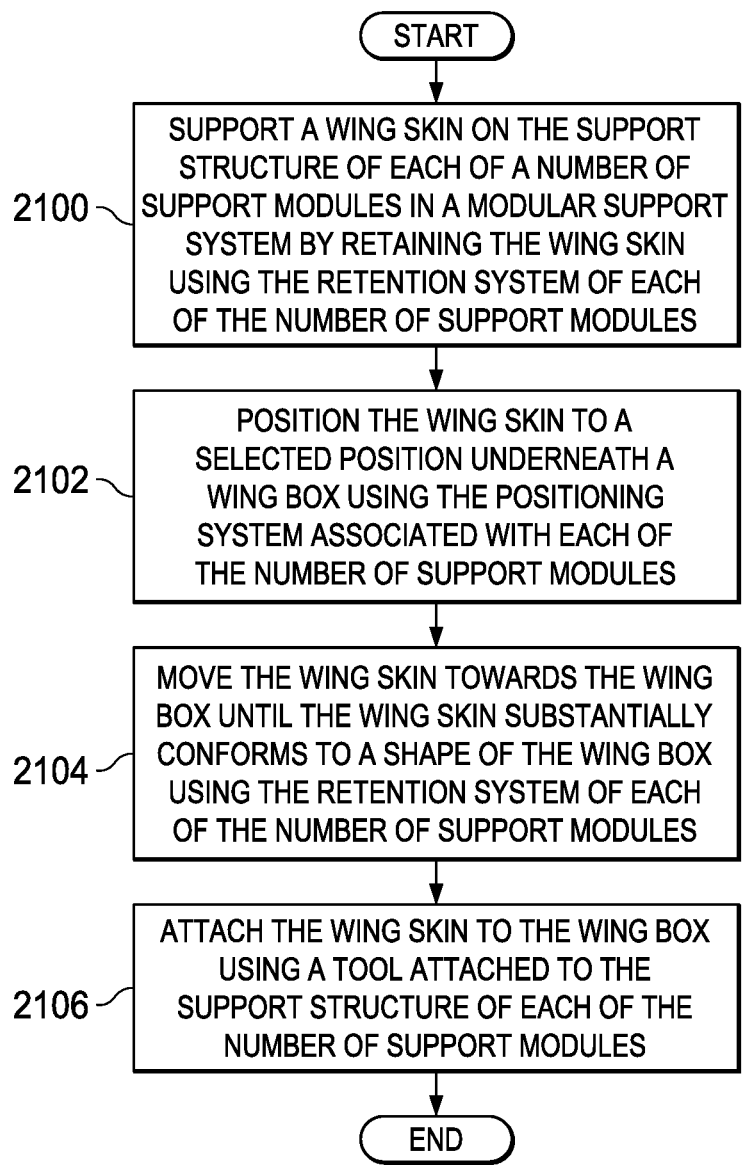
FIG. 21 is an illustration of a process for supporting and loading a wing skin underneath a wing box in the form of a flowchart in accordance with an illustrative embodiment.

With reference now to FIG. 21, an illustration of a process for supporting and loading a wing skin underneath a wing box is depicted in the form of a flowchart in accordance with an illustrative embodiment. The process illustrated in FIG. 20 may be implemented using modular support system 102 in FIG. 1 to support and load wing skin 112 underneath wing box 113 from FIG. 1.

The process may begin by supporting wing skin 112 on the support structure of each of number of support modules 114 in modular support system 102 by retaining wing skin 112 using the retention system of each of number of support modules 114 (operation 2100). Next, wing skin 112 is positioned to selected position 106 underneath wing box 113 using the positioning system associated with each of number of support modules 114 (operation 2102).

Thereafter, wing skin 112 is moved towards wing box 113 until wing skin 112 substantially conforms to a shape of wing box 113 using the retention system of each of number of support modules 114 (operation 2104). Operation 2104 may be performed using positioning system 124. In other illustrative examples, movement of wing skin 112 may be aided using some other type of motorized device. Wing skin 112 is then attached to wing box 113 using a tool attached to the support structure of each of number of support modules 114 (operation 2106), with the process terminating thereafter.

In this manner, modular support system 102 from FIG. 1 may be used to install wing skins for aircraft. Further, modular support system 102 may also be used to transport wing skins between facilities during manufacturing.

Figure 22:
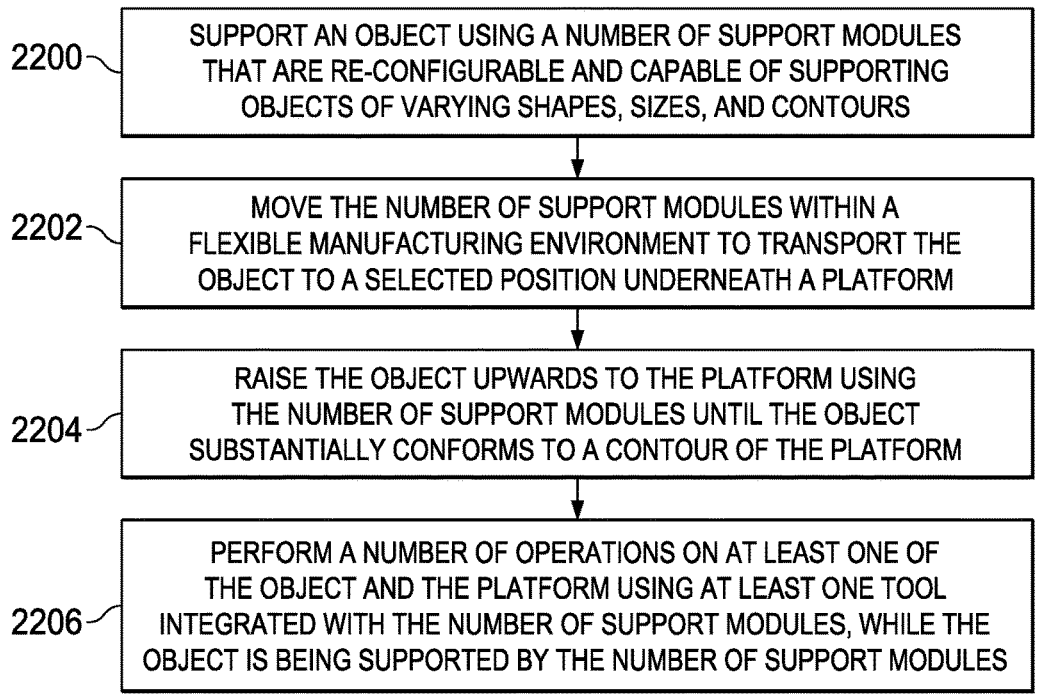
FIG. 22 is an illustration of a process for transporting and loading an object to a platform in a flexible manufacturing environment in the form of a flowchart in accordance with an illustrative embodiment.

With reference now to FIG. 22, an illustration of a process for transporting and loading an object to a platform in a flexible manufacturing environment is depicted in the form of a flowchart in accordance with an illustrative embodiment. The process illustrated in FIG. 22 may be implemented using modular support system 102 in FIG. 1. Modular support system 102 may be used to transport and load object 104 to platform 108 within flexible manufacturing environment 101.

The process may begin by supporting object 104 using number of support modules 114 that are reconfigurable and capable of supporting objects of varying shapes, sizes, and contours (operation 2200). Next, number of support modules 114 may be moved within flexible manufacturing environment 101 to transport object 104 to selected position 106 underneath platform 108 (operation 2202).

Thereafter, object 104 may be raised upwards to platform 108 using number of support modules 114 until object 104 substantially conforms to a contour of platform 108 (operation 2204). Number of operations 152 may then be performed on at least one of object 104 and platform 108 using at least one tool integrated with number of support modules 114, while object 104 is being supported by number of support modules 114 (operation 2206), with the process terminating thereafter.

Figure 23:
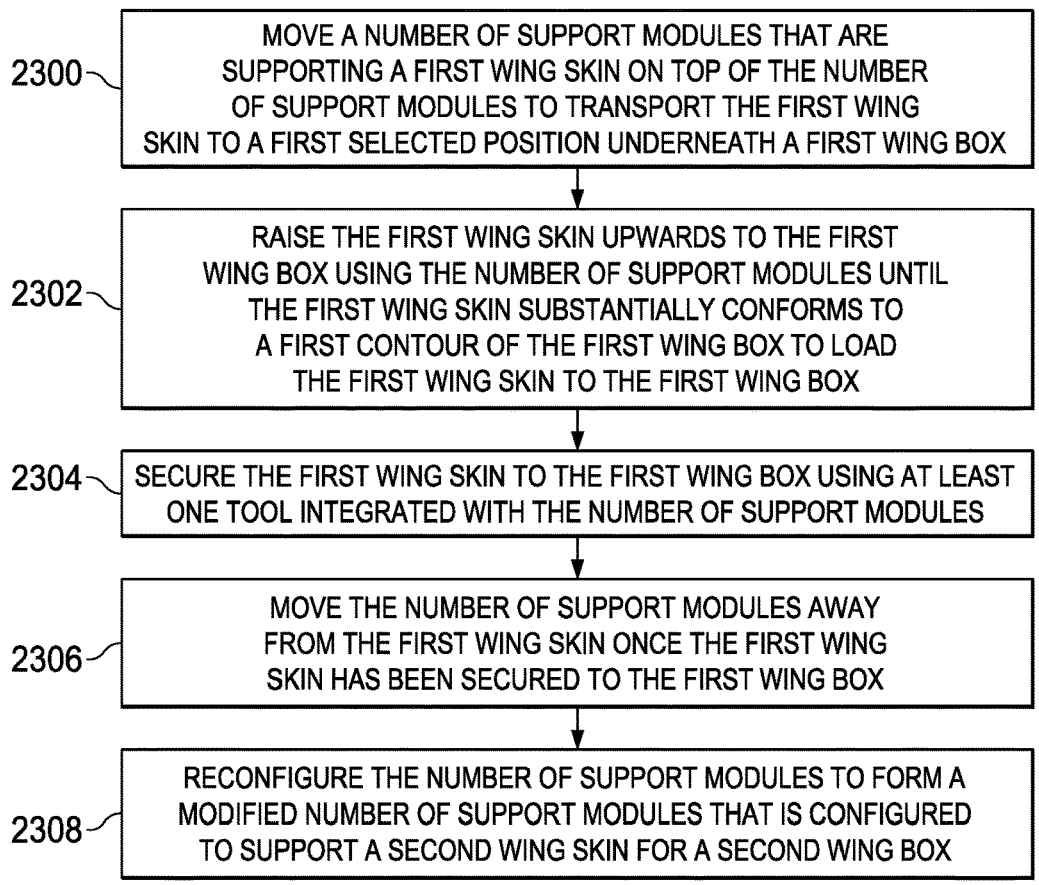
FIG. 23 is an illustration of a process for transporting and loading wing skins to wing boxes in the form of a flowchart in accordance with an illustrative embodiment.

With reference now to FIG. 23, an illustration of a process for transporting and loading wing skins to wing boxes is depicted in the form of a flowchart in accordance with an illustrative embodiment. The process illustrated in FIG. 23 may be implemented using modular support system 102 in FIG. 1. In particular, the process may be used to transport and load wing skins, such as wing skin 112, to wing boxes, such as wing box 113.

The process may begin by moving number of support modules 114 that are supporting a first wing skin on top of number of support modules 114 to transport the first wing skin to a first selected position underneath a first wing box (operation 2300). The first wing skin may be raised upwards to the first wing box using number of support modules 114 until the first wing skin substantially conforms to a first contour of the first wing box to load the first wing skin to the first wing box (operation 2302).

The first wing skin may be secured to the first wing box using at least one tool integrated with number of support modules (operation 2304). Number of support modules 114 may be moved away from the first wing skin once the first wing skin has been secured to the first wing box (operation 2306). Thereafter, number of support modules 114 may be reconfigured to form a modified number of support modules that is configured to support a second wing skin for a second wing box (operation 2308), with the process terminating thereafter. The modified number of support modules may then be used to support, transport, and load the second wing skin to the second wing box.

The second wing skin may have at least one of a different shape, a different size, or a different contour than the first wing skin. Further, the second wing skin may have a different contour than the first wing skin.

Figure 24:
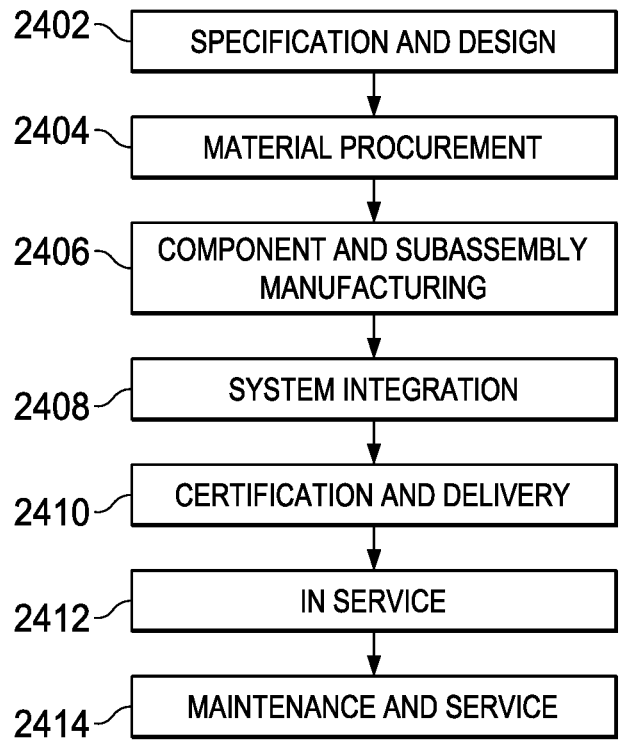
FIG. 24 is an illustration of an aircraft manufacturing and service method in the form of a flowchart in accordance with an illustrative embodiment.
Figure 25:
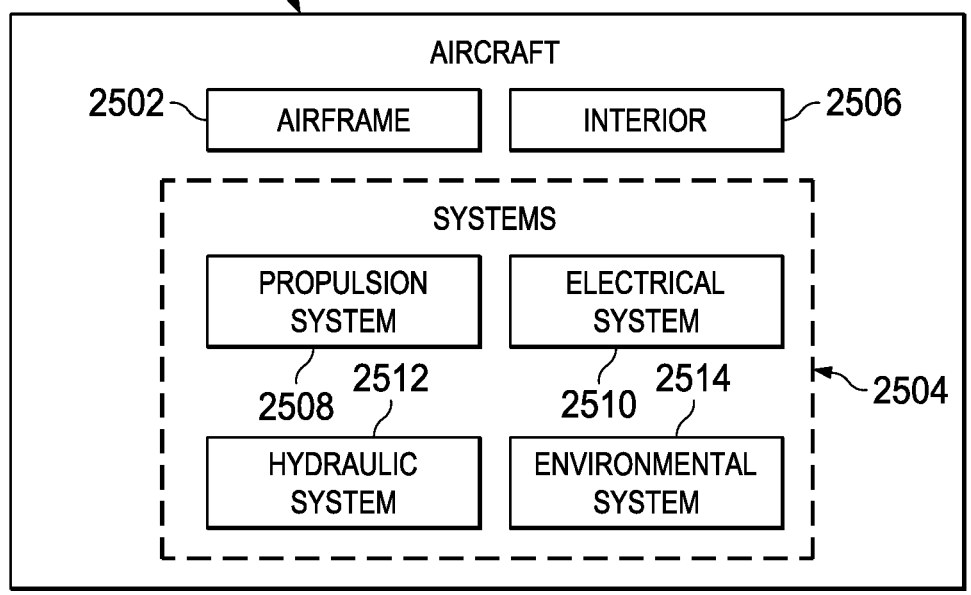
FIG. 25 is an illustration of an aircraft in the form of a block diagram in accordance with an illustrative embodiment.

Illustrative embodiments of the disclosure may be described in the context of aircraft manufacturing and service method 2400 as shown in FIG. 24 and aircraft 2500 as shown in FIG. 25. Turning first to FIG. 24, an illustration of an aircraft manufacturing and service method is depicted in the form of a flowchart in accordance with an illustrative embodiment. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 in FIG. 25 takes place. Thereafter, aircraft 2500 in FIG. 25 may go through certification and delivery 2410 in order to be placed in service 2412. While in service 2412 by a customer, aircraft 2500 in FIG. 25 is scheduled for routine maintenance and service 2414, which may include modification, reconfiguration, refurbishment, and other maintenance or service.

Each of the processes of aircraft manufacturing and service method 2400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 25, an illustration of an aircraft is depicted in the form of a block diagram in which an illustrative embodiment may be implemented. In this example, aircraft 2500 is produced by aircraft manufacturing and service method 2400 in FIG. 24 and may include airframe 2502 with plurality of systems 2504 and interior 2506. Examples of systems 2504 include one or more of propulsion system 2508, electrical system 2510, hydraulic system 2512, and environmental system 2514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2400 in FIG. 24. In particular, modular support system 102 from FIG. 1 may be used for transporting, supporting, and loading a wing skin for a wing of aircraft 2500 during aircraft manufacturing and service method 2400. For example, without limitation, modular support system 102 may be used during the component and subassembly manufacturing 2406, system integration 2408, routine maintenance and service 2414, or some other stage of aircraft manufacturing and service method 2400.

In one illustrative example, components or subassemblies produced in component and subassembly manufacturing 2406 in FIG. 24 may be fabricated or manufactured in a manner similar to components or subassemblies produced while aircraft 2500 is in service 2412 in FIG. 24. As yet another example, one or more apparatus embodiments, method embodiments, or a combination thereof may be utilized during production stages, such as component and subassembly manufacturing 2406 and system integration 2408 in FIG. 24. One or more apparatus embodiments, method embodiments, or a combination thereof may be utilized while aircraft 2500 is in service 2412 and/or during maintenance and service 2414 in FIG. 24. The use of a number of the different illustrative embodiments may substantially expedite the assembly of and/or reduce the cost of aircraft 2500.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a modular support system, such as modular support system 102 in FIG. 1 and modular support system 200 in FIG. 2, which may be used within a working environment, such as, for example, without limitation, a flexible manufacturing environment. Number of support modules 114 may be adjusted to support a variety of ribs to panel joining operations. A support module in number of support modules 114 may not be location-specific.

In other words, the support module may not only be configured for use in supporting a particular portion of an object, such as a wing skin. Rather, the support module may be reconfigurable and able to accommodate a variety of shapes, sizes, and/or contours. As a result, a fewer number of support modules may be needed within a working environment. With fewer support modules needed, modular support system 102 may provide a more ergonomically desirable working environment for human operators working within the working environment. Further, the adjustable nature of modular support system 102 may improve ergonomic access for human operators to perform operations under object 104 being supported by modular support system 102.

Additionally, modular support system 102 may have a low infrastructure system that may be used in a setting such as, for example, without limitation, a factory, without requiring costly floor installations, rails, tracks, and/or external jacks. More specifically, modular support system 102 may be used on a substantially smooth floor without any additional devices and/or structures.

Further, by integrating tooling with modular support system 102, tooling operations on object 104 supported by modular support system 102 and/or on platform 109 to which object 104 is being loaded may be performed more easily, more quickly, and more efficiently. The automated nature of modular support system 102 may be able to support counterbalanced manual tools and/or loading portable automated devices to local work zones.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
a support structure;
a positioning assembly that comprises:
  a linear system that comprises:
    a scissor lift;
    a first moveable base associated with the scissor lift;

a second moveable base associated with the scissor lift; and an actuation system configured to move the first moveable base and the second moveable base to move a work platform associated with the scissor lift in a direction substantially parallel to a Z-axis in which the work platform is associated with a portion of the support structure; and a rotational system configured to position the portion of the support structure with respect to a number of rotational axes;

a retention system associated with the support structure and configured to retain a portion of an object and move the portion of the object towards a platform such that the portion of the object substantially conforms to a shape of the platform; and an attachment system configured to attach a tool to the support structure wherein the tool is configured to perform a number of operations on at least one of: the object and a wing box, such that the number of operations comprises at least one of: drilling, tacking, fastening, riveting, countersinking, nut-driving, painting, reworking, tagging, marking, inspecting, imaging, and videoing.

2. The apparatus of claim 1, further comprising a number of linear axes that comprises at least one of: an X-axis, a Y-axis, and the Z-axis and wherein the number of rotational axes includes at least one of an A-axis, a B-axis, and a C-axis.

3. The apparatus of claim 1, wherein the linear system further comprises:
 a first plurality of rollers associated with the first moveable base associated with the scissor lift; and
 a second plurality of rollers associated with the second moveable base associated with the scissor lift, wherein the first plurality of rollers and the second plurality of rollers are configured to move the positioning assembly in a direction substantially parallel to an X-axis.

4. The apparatus of claim 1, wherein the linear system further comprises:
 a number of rails associated with the work platform associated with the scissor lift; and
 a sliding platform, wherein the sliding platform is configured to move along the number of rails in a direction substantially parallel to a Y-axis.

5. The apparatus of claim 1, wherein the rotational system comprises:
 a rotating device configured to rotate the portion of the support structure along a rotational axis substantially concentric to a C-axis; and
 a number of tilting elements associated with the portion of the support structure and configured to rotate the portion of the support structure along a rotational axis substantially concentric to an A-axis.

6. The apparatus of claim 1, wherein the retention system comprises:
 a number of adhesion systems in which each of the number of adhesion systems is configured to adhere to the portion of the object.

7. The apparatus of claim 6, wherein an adhesion system in the number of adhesion systems comprises:
 a suction cup system configured to adhere to the portion of the object by applying at least one of a vacuum and negative pressure to the portion of the object.

8. The apparatus of claim 1, wherein the support structure, the positioning assembly, and the retention system associated with the support structure form a support module in a number of support modules.

9. The apparatus of claim 8 further comprising:
 a base, wherein the number of support modules is configured to move along the base and wherein the number of support modules and the base form a modular support system.

10. The apparatus of claim 9, wherein the object is a wing skin and the platform is a wing box and wherein the modular support system is configured to support the wing skin for loading underneath the wing box.

11. The apparatus of claim 1, wherein the tool is an automated tool.

12. A modular support system that comprises:
 a number of support modules in which a support module in the number of support modules comprises:
  a support structure;
  a positioning assembly that comprises:
   a linear system that comprises:
    a scissor lift;
    a first moveable base associated with the scissor lift;
    a second moveable base associated with the scissor lift; and
    an actuation system configured to move the first moveable base and the second moveable base to move a work platform associated with the scissor lift in a direction substantially parallel to a Z-axis in which the work platform is associated with a portion of the support structure; and
   a rotational system configured to position the portion of the support structure with respect to a number of rotational axes;
  a retention system associated with the support structure and configured to retain a portion of an object and move the portion of the object towards a platform such that the portion of the object substantially conforms to a shape of the platform;
  an attachment system configured for use in attaching a tool to the support structure, such that the tool is configured to perform a number of operations on at least one of: the object and a wing box, such that the number of operations comprises at least one of: drilling, tacking, fastening, riveting, countersinking, nut-driving, painting, reworking, tagging, marking, inspecting, imaging, and videoing; and
 a base, in which the number of support modules is configured to move along the base.

13. The modular support system of claim 12, further comprising the number of support modules configured to be progressively removed after the object is secured to a wing box.

14. The modular support system of claim 12, wherein the retention system comprises an adhesion system.

15. The modular support system of claim 12, wherein the retention system comprises a suction cup system.

16. A method for supporting an object, the method comprising:
 retaining a portion of the object using a retention system associated with a support structure;
 attaching, to the support structure using an attachment system, a tool for performing a number of operations on at least one of: the object and a wing box, the number of operations comprising at least one of: drilling, tacking, fastening, riveting, countersinking, nut-driving, painting, reworking, tagging, marking, inspecting, imaging, and videoing;

positioning the support structure with respect to a number of linear axes such that the portion of the object is positioned relative to a platform using a positioning assembly;

moving, using an actuation system, a first moveable base associated with a scissor lift;

moving a second moveable base moving a work platform associated with the scissor lift in a direction substantially parallel to a Z-axis in which the work platform is associated with a portion of the support structure; and positioning, using a rotational system, the portion of the support structure respective to a number of rotational axes; and moving the object towards the platform using the retention system such that the portion of the object substantially conforms to a shape of the platform.

17. The method of claim 16, wherein moving the object towards the platform using the retention system such that the portion of the object substantially conforms to the shape of the platform comprises:

applying force to the portion of the object using the retention system such that the object substantially conforms to the shape of the platform.

18. The method of claim 16, further comprising:

securing the object to the wing box; and progressively removing a number of support modules underneath the work platform after securing the object to the wing box.

19. The method of claim 16, wherein , wherein the retention system comprises an adhesion system.

20. The method of claim 16, wherein , wherein the retention system comprises a suction cup system.

* * * * *